United States Patent
Dekker

(10) Patent No.: US 11,176,300 B2
(45) Date of Patent: Nov. 16, 2021

(54) SYSTEMS AND METHODS FOR CREATING INDIVIDUALIZED PROCESSING CHIPS AND ASSEMBLIES

(71) Applicant: IRDETO B.V., Hoofddorp (NL)

(72) Inventor: Gerard Johan Dekker, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 376 days.

(21) Appl. No.: 16/266,043

(22) Filed: Feb. 2, 2019

(65) Prior Publication Data

US 2019/0243952 A1 Aug. 8, 2019

Related U.S. Application Data

(60) Provisional application No. 62/625,984, filed on Feb. 3, 2018.

(51) Int. Cl.
*G06F 30/30* (2020.01)
*H01L 27/00* (2006.01)
(Continued)

(52) U.S. Cl.
CPC ............ *G06F 30/337* (2020.01); *G06F 30/30* (2020.01); *G06F 30/32* (2020.01); *G06F 30/39* (2020.01);
(Continued)

(58) Field of Classification Search
CPC ... G06F 30/00–398; G06F 2111/00–20; G06F 21/14; G06F 21/73; G06F 2211/007; H01L 27/0203; H01L 27/0207
See application file for complete search history.

(56) References Cited

U.S. PATENT DOCUMENTS 4,766,516 A * 8/1988 Ozdemir .................. H01L 27/02
361/820
6,594,761 B1 7/2003 Chow et al.
(Continued)

FOREIGN PATENT DOCUMENTS

GB 201609781 6/2016
WO 2011120123 A1 10/2011
(Continued)

OTHER PUBLICATIONS

E. Sperling, "Securing Chips During Manufacturing," Semiconductor Engineering/Deep Insights for the Tech Industry, Jul. 7, 2016, pp. 1-9. (Year: 2016).*
(Continued)

*Primary Examiner* — Leigh M Garbowski
(74) *Attorney, Agent, or Firm* — Rimon PC, Marc Kaufman

(57) ABSTRACT

Systems and methods for producing individualized processing chips, each individualized processing chip being arranged to carry out a common processing operation are disclosed. A processing chip design is received, wherein the common processing operation is specified, at least in part, by the processing chip design. For each individualized processing chip the processing chip design is individualized to produce an individualized processing chip design, in accordance with an individualized set of transformations for the individualized processing chip, by including a respective set of modifications as part of the individualized processing chip design that implement the individualized set of transformations. Each transformation of the individualized set of transformations is a transform for an interconnect, specified in the processing chip design, of at least two logic cells specified in the processing chip design. For each individualized processing chip the individualized processing chip design is provided for fabrication of the individualized (Continued)

processing chip according to the individualized processing chip design. The individualized set of transformations for one individualized chip is different to the individualized set of transformations for at least one other individualized chip.

30 Claims, 12 Drawing Sheets

(51) Int. Cl.
| | | |
|---|---|---|
| G06F 21/00 | (2013.01) | |
| G06F 30/337 | (2020.01) | |
| H01L 27/02 | (2006.01) | |
| G06F 30/39 | (2020.01) | |
| G06F 30/32 | (2020.01) | |
| G06F 21/14 | (2013.01) | |
| G06F 21/73 | (2013.01) | |
| G06F 111/20 | (2020.01) | |

(52) U.S. Cl.
CPC ...... *H01L 27/0203* (2013.01); *H01L 27/0207* (2013.01); *G06F 21/14* (2013.01); *G06F 21/73* (2013.01); *G06F 2111/20* (2020.01); *G06F 2211/007* (2013.01)

(56) References Cited

U.S. PATENT DOCUMENTS

| | | | |
|---|---|---|---|
| 6,779,114 B1 | 8/2004 | Chow et al. | |
| 6,842,862 B2 | 1/2005 | Chow et al. | |
| 7,316,934 B2* | 1/2008 | Mangell | G03F 1/00 438/7 |
| 7,809,135 B2* | 10/2010 | Johnson | H04L 9/0631 380/44 |
| 10,242,233 B2* | 3/2019 | Loubet Moundi | H04L 9/3236 |
| 10,600,733 B2* | 3/2020 | van Kervinck | H01L 29/0692 |
| 10,607,948 B2* | 3/2020 | Dekker | H01J 37/3174 |
| 10,714,427 B2* | 7/2020 | De Langen | H01L 23/544 |
| 2006/0064191 A1* | 3/2006 | Naya | H01L 23/544 700/116 |
| 2018/0375670 A1* | 12/2018 | May | G06F 7/588 |

FOREIGN PATENT DOCUMENTS

| | | | | |
|---|---|---|---|---|
| WO | WO-2013189741 A1 | * | 12/2013 | ............. G06F 21/73 |
| WO | 2015150376 A1 | | 10/2015 | |
| WO | 2015150398 A2 | | 10/2015 | |
| WO | 2016156378 A1 | | 10/2016 | |

OTHER PUBLICATIONS

Servin et al, 'Ready for multi-beam exposure at 5kV on MAPPER tool: lithographic and process integration performances of advanced resists/stack', Proceedings vol. 9423, Alternative Lithographic Technologies VII; Mar. 19, 2015; 94231C (2015); doi: 10.1117/12.2085915.

P. Brandt et al, 'Demonstiation of electronic design automation flow for massively parallel e-beam lithography', J. Micro/Nanolith. MEMS MOEMS 13(3), 031306 (Jul. 1, 2014).

S. Chow, et al.: "White-Box Cryptography and an AES Implementation," Proc. 9th Annual Workshop on Selected Areas in Cryptography (SAC 2002), Aug. 15, 2002, LNCS 2595, pp. 250-270.

S. Chow, et al.: "A White-Box DES Implementation for DRM Applications," Proc. 2nd ACM Workshop on Digital Rights Management (DRM2002), Oct. 15, 2002, LNCS 2696, pp. 1-15.

Y. Zhou, et al.: "Information Hiding in Software with Mixed Boolean-Arithmetic Transforms," 8th International Workshop on Information Security Applications (WISA 2007), pp. 61-75, Aug. 27, 2007, Jeju Island, Korea, Springer LNCS 4867, 2008.

Michael J. Wiener: "Applying Software Protection to White-Box Cryptography," Proc. 5th Program Protection and Reverse Engineering Workshop (PPREW-5), Dec. 8, 2015, DOI=http://doi.acm.org/10.1145/2843859.2846054.

Y. Gu, et al.: "White-Box Cryptography: Practical Protection on Hostile Hosts," Proc. 6th Software Security, Protection and Reverse Engineering Workshop (SSPREW-7), Dec. 5, 2016, DOI=http://doi.acm.org/10.1145/3015135.3015139.

Wikipedia, Very Large Scale Integration, Jan. 10, 2018, https://en.wikipedia.org/wiki/Very-large-scale_integration.

Wikipedia, Photolithography, Jan. 22, 2018, https://en.wikipedia.org/wiki/Photolithography.

Wikipedia, Electron-beam lithography, Sep. 12, 2017; http://en.wikipedia.org/wiki/Electron-beam_lithography.

* cited by examiner

SYSTEMS AND METHODS FOR CREATING INDIVIDUALIZED PROCESSING CHIPS AND ASSEMBLIES

RELATED APPLICATION

This application claims the benefit of priority from Provisional Patent Application No. 62/625,984, filed Feb. 3, 2018, the contents of which are incorporated herein by reference in their entirety.

FIELD OF THE DISCLOSURE

The present disclosure relates to systems and methods for creating multiple individualized processing chips and assemblies instances of information processing hardware.

BACKGROUND

Cyber security has recently become a priority of computing device manufacturers and users. Software attacks can present great risk and potential loss of data, intellectual property, and funds. Sophisticated software hackers pose significant threats to national security and defense, personal privacy, and government operations. Pervasive threats to software and hardware security include reverse engineering, software tampering, copying/cloning, and automated attacks. A successful security strategy against these threats is often a multi-dimensional approach—data security, network/API security and software protection.

The distributed nature of systems often means that various devices are used within a system and that some devices might not be physically secure or within the control of a party transmitting information. Cryptography is increasingly deployed in applications that are executed on such unsecured devices (such as PCs, tablets or smartphones). In many instances, an attacker has complete control over the execution platform and the software implementation itself. This means that an attacker can easily analyze the binary code of the application, and the corresponding memory during execution using known tools. System calls can be intercepted and execution can be tampered with. Such an attack is known as a "whitebox" attack.

"Whitebox cryptography" addresses the problem of implementing a cryptographic algorithm in software in such a way that cryptographic assets remain secure even when subject to white-box attacks, i.e. even when the device is not secure and an attacker can analyze the binary code of the application, and the corresponding memory during execution. Cryptographic operations are performed without revealing any portion of confidential information such as the cryptographic key. Software obfuscation refers to changing code to make it more difficult to understand, while not adversely affecting the resulting functions of the code. For example, expressions can be replaced with more complex expression or additional dependencies can be created in the software. One aspect of software obfuscation security is to generate diversified instances of software which are functionally equivalent but are each uniquely obfuscated to conceal the actual program flow, data representation, proprietary algorithms and secrets, including cryptographic keys. Once protected, these applications can be safely deployed on untrusted hosts and in hostile environments such as mobile devices. Various products and services, such as Cloakware™, allow such software diversification.

Cloakware™ includes libraries and tools that enable customization of protection of critical digital assets such as keys, code and data. Protection is achieved through sophisticated data, function and control flow transformations, anti-debug, whitebox cryptography and active integrity verification. Software diversification can be effective on a broad range of platforms including platforms that do not have hardware protection in the form of a secure execution environment.

The hardware used, to carry out particular operations required for the overall functionality of the computing device is often in the form of one or more processing chips. Such processing chips are often known as semiconductor chips, of which a specific example is a silicon chip For reasons of cost an efficiency such processing chips are typically manufactured in bulk, with modern manufacturing process that strongly favor the production large numbers of identical chips. The most widely used methods of bulk manufacturing semiconductor devices (or chips), such as Very Large Scale Integration (VLSI) type semiconductor devices, uses stepper machines and optical (UV) lithography. As such semiconductor chips and their manufacture is well-known, further detail shall not be provided herein. However, more information on semiconductor chips and the manufacture thereof (in particular VLSI type chips) can be found at, for example, https://en.wikipedia.org/wiki/Very-large-scale_integration, the entire contents of which are incorporated herein by reference. This allows large numbers of identical semiconductor chips to be created from single wafers of substrate (such as silicon). As is well-known, lithographic techniques typically involve selectively removing areas of a resist, which initially covers a surface of the substrate. This enables creation of very small structures in the resist that can subsequently be transferred to the substrate material by further processing. Such further processing typically involves etching and/or deposition of further material. The resultant structures on the substrate implement electronic circuits that provide the functionality of the semiconductor chip.

The optical (UV) lithography that is typically used in bulk manufacture of such chips involves using a photosensitive "resist", and a mask having a negative (or positive depending upon the resist mechanism) image of the circuits to be applied. Light (typically UV light) is shone through the mask onto the resist. The areas of the resist illuminated by the light are chemically altered such that they may be selectively removed using a further chemical process. Typically, the optical exposure changes the solubility of the resist, enabling selective removal of either the exposed or non-exposed regions of the resist by immersing the resist in a solvent (i.e. developing). This creates the very small structures in the resist. As optical lithography (or photolithography) is well-known, further detail shall not be provided herein. However, more information on optical lithography can be found at, for example, https://en.wikipedia.org/wiki/Photolithography the entire contents of which are incorporated herein by reference.

The masks used in this lithographic technique are costly to make and it is considered impractical to make individual masks for the purpose of hardware diversification. Semiconductor chips can also be created using electron-beam lithography (or e-beam lithography). E-beam lithography involves scanning a focused beam of electrons to draw or write custom shapes on an electron-sensitive resist. As fine control of beam scanning is possible, there is no need to use a mask. Here, the electron beam changes the solubility of the resist, enabling selective removal of either the exposed or non-exposed regions of the resist by immersing the resist in a solvent. As e-beam lithography is well-known, further detail shall not be provided herein. However, more information on e-beam lithography can be found at, for example, http://en.wikipedia.org/wiki/Electron-beam_lithography, the entire contents of which are incorporated herein by reference. An example of creation of chips using electron beam lithography is by Mapper Lithography (see http://www.mapperlithography.com/). Unfortunately, whilst e-beam lithography can be used for producing short runs of semiconductor chips it tends to be unsuitable (due to cost and speed) for the bulk manufacture of semiconductor chips, especially VSLI type chips.

As such an assumption of existing software obfuscation implementations is that the hardware is not aware of any data transformations or control flow changes. Therefore, all interactions with hardware require that the data transformations as applied in the obfuscated software be reversed, with an inverse transformation, by the software. Software obfuscation with uniquely diversified software instances has been shown to provide additional security for software deployed in hostile environments. This approach has been widely used to protect software implementing digital rights management features for valuable content such as music, videos, and games and other applications.

The concept of the Internet of Things (IOT) and connected devices has increased the need for protection against a growing list of exposures to external threats. In such implementations valuable data often must be secured while travelling over public networks. The value for attackers to break into these systems increases as the popularity of connected sensors and other devices soars. An attacker's business case becomes more attractive if a single exploit can be used to attack a large population of devices—a so-called "class attack". This remains true, even if there is a significant upfront investment required in hacking the security in the first instance, provided the attack can then easily be scaled up to attack entire classes of devices.

SUMMARY

According to a first aspect of the invention there is provided a method for producing individualized (or diversified) processing chips, each individualized processing chip being arranged to carry out a common processing operation, the method comprising: receiving a processing chip design, wherein the common processing operation is specified, at least in part, by the processing chip design; and for each individualized processing chip: individualizing the processing chip design to produce an individualized processing chip design, in accordance with an individualized set of transformations for the individualized processing chip, by including a respective set of modifications as part of the individualized processing chip design that implement the individualized set of transformations, wherein each transformation of the individualized set of transformations is a transform for an interconnect, specified in the processing chip design, of at least two logic cells specified in the processing chip design; and providing the individualized processing chip design for fabrication of the individualized processing chip according to the individualized processing chip design, wherein the individualized set of transformations for one individualized chip is different to the individualized set of transformations for at least one other individualized chip.

In some embodiments the method further comprises, for each individualized processing chip, fabricating the individualized processing chip according to the individualized processing chip design.

In some embodiments the method further comprises, for each individualized processing chip, receiving the respective set of modifications from a storage.

In some embodiments the step of fabricating comprises fabricating one or more copies of the individualized processing chip according to the individualized processing chip design.

In some embodiments the method further comprises for each individualized chip, storing an identification of the individualized chip in correspondence with either: (a) the respective set of modifications or (b) the individualized set of transformations for the individualized chip.

In some embodiments at least one transformation of the individualized set of transformations is compensated for by one or more other transformations in the individualized set of transformations.

In some embodiments the individualized set of transformations comprise one or more pairs of transformations, wherein for each pair of transformations one of the pair of transformations is the inverse of the other transformation of the pair. One of the pair of transformations may be for one end of the interconnect and one transformation for another end of the interconnect.

In some embodiments the individualized set of transformations are selected such that the individualized chip is arranged to carry out the common operation with an overall transformation applied to an input or an output of the common processing operation.

In some embodiments the individualized set of transformations are selected such that, for any input, every individualized chip produces the same output.

In some embodiments the step of fabricating comprises for each logic cell of the first set of logic cells, applying the set of modifications using e-beam lithography.

In some embodiments a modification of the respective set of modifications comprise any one or more of: one or more additional VIAs; one or more VIA connections; modifications to one or more VIAs; one or more changes to signal lines of the corresponding logic cell interconnect; one or more additional transistors; and; one or more additional logic units.

In some embodiments a transformation of the individualized set of transformations comprises a transformation of a signal representation of the corresponding logical cell interconnect. The transformation of the individualized set of transformations may comprise any of: a logical NOT operation being applied to one or more signal lines of the of the corresponding logic cell interconnect; a permutation of two or more signal lines of the corresponding logic cell interconnect; and a linear formula being applied to a signal value carried by the corresponding logic cell interconnect, or any other invertible function (or operation or formula).

According to a second aspect of the invention there is provided a batch of individualized (or diversified) processing chips, wherein each processing chip is arranged to carry out a common processing operation, each individualized processing chip comprising: a plurality of logic cells common to the plurality of individualized chips; a plurality of interconnects common to the plurality of individualized chips, each interconnect of the plurality of interconnects connecting two or more respective logic cells of the plurality of logic cells; a respective set of modifications that implement an individualized set of transformations for the individualized processing chip, wherein each transformation of the individualized set of transformations for the individualized processing chip, is a transform for a respective interconnect of the plurality of interconnects, wherein the individualized set of transformations for one individualized chip is different to the individualized set of transformations for at least one other individualized chip. In some embodiments such a batch of individualized processing chips may be manufactured in line with a method of the first aspect or any embodiment thereof and/or using a system of the third aspect or any embodiment thereof as described below.

According to a third aspect of the invention there is provided a system (or device) for producing individualized processing chips, each individualized processing chip being arranged to carry out a common processing operation, according to the method of the first aspect or any embodiment thereof. In some embodiments the system comprises: one or more hardware computer processors; and one or more memories storing machine-readable instructions which, when executed by the one or more hardware processors, cause the one or more hardware processors to: receive a processing chip design, wherein the common processing operation is specified, at least in part, by the processing chip design; and for each individualized processing chip: individualize the processing chip design to produce an individualized processing chip design, in accordance with an individualized set of transformations for the individualized processing chip, by including a respective set of modifications as part of the individualized processing chip design that implement the individualized set of transformations, wherein each transformation of the individualized set of transformations is a transform for an interconnect, specified in the processing chip design, of at least two logic cells specified in the processing chip design; and provide the individualized processing chip design for fabrication of the individualized processing chip according to the individualized processing chip design, wherein the individualized set of transformations for one individualized chip is different to the individualized set of transformations for at least one other individualized chip.

According to a fourth aspect of the invention there is provided a method of producing individualized electronic processing assemblies each individualized electronic processing assembly being arranged to carry out a common processing operation, the method comprising: receiving a processing assembly design, wherein the common processing operation is specified, at least in part, by the processing assembly design, and wherein a required processing sub-operation of the common processing operation is specified, at least in part, by the processing assembly design; and for each individualized electronic processing assembly: individualizing the processing assembly design to produce an individualized processing assembly design, in accordance with an individualized set of transformations for the individualized processing assembly, by: including a respective set of modifications in the individualized processing assembly design that implement the individualized set of transformations, and specifying a respective individualized processing chip from a batch of individualized processing chips as a logical unit of the processing assembly design, said respective individualized chip being arranged to carry out the required processing sub-operation and to apply an respective overall transformation to an input or an output of the processing sub-operation, wherein each transformation of the individualized set of transformations is a transform for an interconnect, specified in the processing assembly design, between at least two logical units specified in the processing assembly design; and providing the individualized processing assembly design for fabrication of an individualized electronic processing assembly according to the individualized processing assembly design, wherein for each individualized electronic processing assembly the individualized set of transformations is arranged to compensate for the respective overall transformation of the respective individualized chip to enable the individualized electronic processing assembly to carry out the common processing operation, wherein the individualized set of transformations and the respective transform applied by the individualized processing chip for one electronic processing assembly are different to the individualized set of transformations and the respective transform applied by the individualized processing chip for at least one other electronic processing assembly.

In some embodiments the method may further comprise, for each individualized electronic processing assembly design, fabricating the individualized electronic processing assembly according to the individualized processing assembly design, wherein the individualized electronic processing assembly comprises the specified respective individualized processing chip.

One or more (or each) of the electronic processing assemblies may be, or comprise, a printed circuit board.

In some embodiments the respective individualized processing chip may be embodied on a printed circuit board.

In some embodiments at least part of respective overall transformation is specified by said printed circuit board, and the corresponding interconnect comprises system wiring connecting said printed circuit board with another component of the electronic processing assembly.

According to a fifth aspect there is provided a batch of individualized electronic processing assemblies, wherein each individualized electronic processing assembly is arranged to carry out a common processing operation, the common processing operation having a required processing sub-operation, each individualized electronic processing assembly comprising: a plurality of processing chips common to the individualized electronic processing assemblies; a respective individualized processing chip selected from a batch of individualized processing chips, the respective individualized processing chip arranged to carry out the required processing sub-operation and arranged to apply a respective overall transformation to an input or an output of the common processing sub-operation; a plurality of interconnects common to the individualized electronic processing assemblies; a respective set of modifications that implement an individualized set of transformations for the individualized electronic processing assembly, wherein each transformation, of the individualized set of transformations for the individualized electronic processing assembly, is a transform for a respective interconnect of the plurality of interconnects, wherein the individualized set of transformations and the respective transform applied by the individualized processing chip for one electronic processing assembly are different to the individualized set of transformations and the respective transform applied by the individualized processing chip for at least one other electronic processing assembly. In some embodiments such a batch of individualized electronic processing assemblies may be manufactured in line with a method of the fourth aspect or any embodiment thereof and/or using a system of the sixth aspect or any embodiment thereof as described below.

According to a sixth aspect of the invention there is provided a system (or device) for producing individualized electronic processing assemblies each individualized electronic processing assembly being arranged to carry out a common processing operation, according to the method of the fourth aspect or any embodiment thereof. In some embodiments the system comprises: one or more hardware computer processors; and one or more memories storing machine-readable instructions which, when executed by the one or more hardware processors, cause the one or more hardware processors to carry out the method.

According to a seventh aspect of the invention, there is provided to a non-transient computer-readable storage medium having computer readable instructions embodied thereon, the instructions being executable by one or more processors to perform a method according to any one of first or fourth aspects of the invention or any embodiment thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
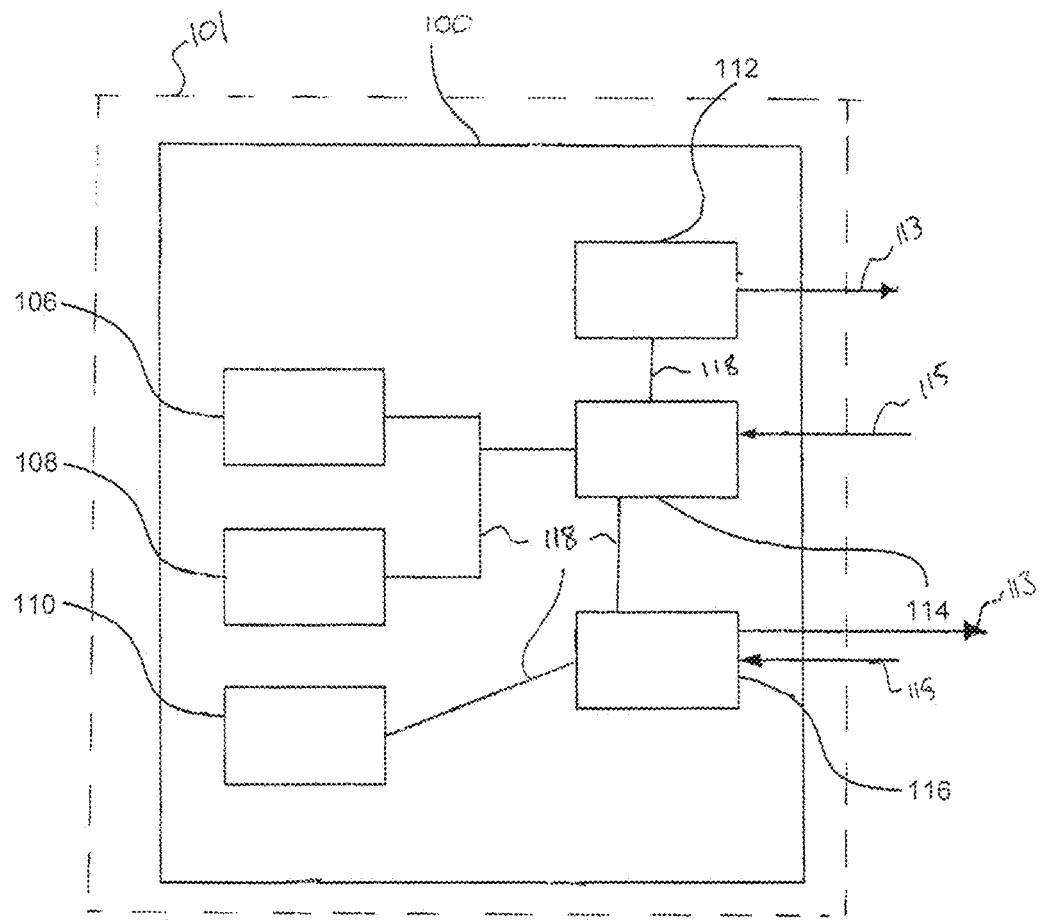
FIG. 1 schematically illustrates an example system of the sort that may be implemented on an electronic processing device.

FIG. 1 schematically illustrates an example system 100 of the sort that may be implemented on an electronic processing device. Whilst the electronic processing device may be any type of electronic device for example comprising multiple printed circuit boards and integrated circuits the following discussion is framed in terms of a processing chip 101 (such as a silicone or semiconductor chip). The system 100 typically comprises one or more logical blocks (or modules) 106; 108; 110; 112; 114; 116. In the example system 100 shown in FIG. 1 the system comprises six logical blocks 106; 108; 110; 112; 114; 116 but it will be appreciated that this is merely exemplary and any number of logical blocks 106; 108; 110; 112; 114; 116 may be present in a particular system 100. The logical blocks 106, . . . , 116 are interconnected by one or more logical connections 118. The topology of the logical connections 118 as shown in FIG. 1 is, again, merely exemplary.

One or more logical blocks 106, . . . , 116, such as the logical block 114, may comprise one or more system inputs 115. The one or more system inputs 115 may provide data to the system 100 to be processed by the logical blocks 106, . . . , 116.

One or more logical blocks 106, . . . , 116, such as the logical block 112, may comprise one or more system outputs 113. The one or more outputs 113 may output data from the system 100, such as results of processing by the logical blocks 106, . . . , 116.

One or more logical blocks 106, . . . , 116, such as the logical block 116 may comprise one or more system inputs 115 and one or more system outputs 113.

The skilled person will appreciate that the system 100 is arranged to provide desired functionality, such as carrying out one or more processing operations. The logical blocks 106, . . . , 116 typically comprise any of sub-operations, functions, processing, procedures, data flows, etc. used by the system 100 to implement the desired functionality. Typically, the logical blocks 106, . . . , 116 are analogous to subroutines or functions or modules in a piece of computer software. In this way it will be understood that the logical blocks may be for carrying out processing sub-operations of the processing operation.

The skilled person will appreciate that the desired functionality implemented by a system 100 such as the example system 100 is not limited in terms of complexity. For example, the system 100 may implement a decryption routine, where encrypted data (and optionally a cryptographic key) is input into the system 100 through an input 115, and decrypted data is output from the system 100 through an output 113. Here the decryption routine may be thought of as a processing operation of the system 100. In this case each logic block 106, . . . , 116 may comprise a different function used in the decryption process (such as the Feistel function or the key schedule function of DES). Such functions may be thought of as processing sub-operations of the decryption routine. A logic block 106, . . . , 116 may comprise logic that stores or generates a particular cryptographic key. Such a system 100 would typically be used with other systems 100 (which may be on other processing chips 101) as part of a complete device.

In other examples the system 100 may implement a full system on chip type system (such as Turing complete processing system). It will be appreciated that a logic block 106, . . . , 116 itself may be a system 100 comprising further logic blocks 106, . . . , 116, and so on and so forth.

A sub-operation may be an operation of any complexity. A sub-operation may be a basic (or low-level) arithmetic or binary processing operation. Alternatively a sub-operation may be a more complex operation such as a hash operation. For example a sub-operation may be, or comprise, the operation of any of a register, a counter, a multiplier, a latch, etc. Similarly a logic block may be or comprise one or more basic operations. In some examples, the logic blocks $106, \ldots, 116$ may comprise more complex functionality, such as any of: a general purpose microprocessor, a memory controller, an Ethernet controller, a graphics processing unit, one or more random access memory units etc.

One or more of the logic blocks $106, \ldots, 116$ may implement a security-related operation (potentially in addition to one or more other operations). For example, the security-related operation may use secret data (such as a cryptographic key and/or encrypted data)—the secret data may be stored by a given logic block(s) $106, \ldots, 116$, or said logic block(s) $106, \ldots, 116$ may be arranged to implement the cryptographic key. The security-related operation may comprise one or more of (i) a cryptographic operation (such as one or more: of an encryption operation; a decryption operation; a digital signature generation operation; a digital signature verification operation; a hash generation operation; a hash verification operation); (ii) a conditional access operation; (iii) a digital rights management operation; (iv) a (cryptographic) key management operation. Such security-related operations are well-known and shall, therefore, not be described in more detail herein. In general, though, the security-related operation is an operation for which (a) it is desirable to prevent an attacker from accessing some or all of the data being used for performing the security-related operation (e.g. the secret data) and/or (b) it is desirable to prevent an attacker from modifying or changing the functioning or processing of the security-related operation to thereby make the security-related operation perform in an unauthorized manner or provide a result that the attacker is not entitled to achieve.

Figure 2:
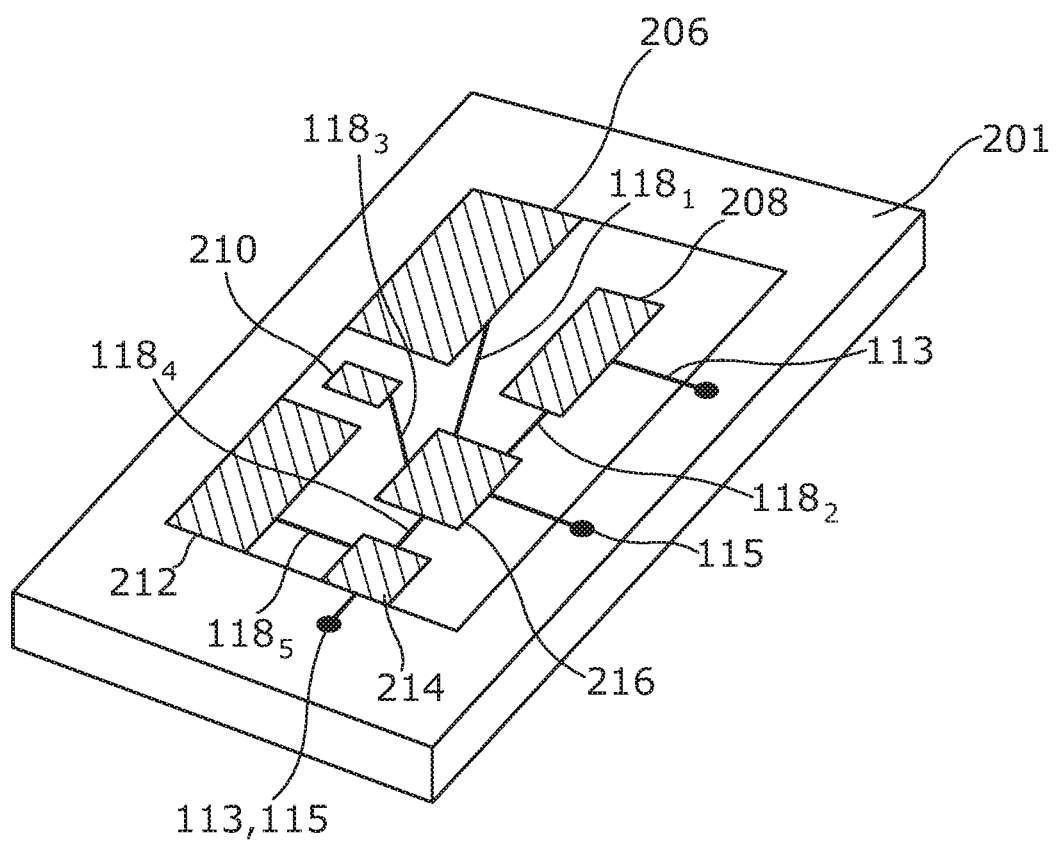
FIG. 2 schematically illustrates an example processing chip 201 having a system such as the system of FIG. 1 implemented thereon.

FIG. 2 schematically illustrates an example processing chip 201 having a system 100 (such as the system 100 of FIG. 1) implemented thereon. The processing chip 201 is shown as comprising six logic cells 206; 208; 210; 212; 214; 216 but it will be appreciated that this is merely exemplary and any number of circuits may be present. FIG. 2 also schematically shows a plurality of interconnects $118_1, 118_2, 118_3, 118_4, 118_5$. An interconnect $118_1, 118_2, 118_3, 118_4, 118_5$ connects one logic cell with at least one other logic cell. In this way logic cells connected by an interconnect may exchange input and/or output over the interconnect. It will be appreciated that in this way the logic cells $206, \ldots, 216$ are typically arranged to operate together to implement the system 100, effectively as a single, chip-wide, circuit. However, for ease of discussion herein particular logic cells $206, \ldots, 216$ will be discussed separately.

As is usual in the field of semiconductor integrated circuits, each logic cell $206, \ldots, 216$ typically corresponds to a respective logic block $106, \ldots, 116$ of the system 100. In particular, each logic cell $206, \ldots, 216$ may implement the functionality of the respective logic block $106, \ldots, 116$. In this way it will be appreciated that a given logic cell $206, \ldots, 216$ may be thought of as implementing (or providing) the required processing sub-operation, which may be specified by one of the logic blocks $106, \ldots, 116$.

A logic cell $206, \ldots, 216$ typically comprises a circuit arranged to carry out the functionality of the logic cell. As will be appreciated the circuit of a logic cell comprises features including any of transistors, diodes, resistors, capacitors, connecting wires, VIAs (which may form part of a connecting wire) and features implementing electronic components. The logic cells are formed on the chip 201 using standard techniques known to those skilled in the art of the manufacture of silicone chip production. In particular the process usually involves, for each logic cell 206, 208, 210, 212, etching the circuit on to the silicon chip (i.e. the silicon wafer that forms the silicon chip 201). The etching uses standard lithographic techniques, such as mask based UV lithography (as described above). Various well-known techniques for depositing required metals and/or oxides may also be used in addition to form each logic cell $206, \ldots, 216$. Given such chip fabrication is well-known to the skilled person we will not discuss these aspects further herein.

An interconnect $118_1, \ldots, 118_5$ may comprise one or more signal lines arranged to carry signals from one logic cell to another logic cell $206, \ldots, 216$. Typically, such signals are binary signals. A logic cell $206, \ldots, 216$ may connect to a plurality of input and/or output signal lines. An interconnect $118_1, \ldots, 118_5$ may comprise a logical group (or part of a logical group) of signal lines connected to a logic cell $206, \ldots, 216$. Such a logical group may be any of: a group of address lines, a group of data lines, a group of control lines etc. In this way it will be appreciated that there may be a signal representation for a given interconnect $118_1, \ldots, 118_5$. Such a signal representation typically comprises the mapping of logical signal values to corresponding electrical signals on the interconnect $118_1, \ldots, 118_5$. For example, in the case that the interconnect $118_1, \ldots, 118_5$ comprises four signal lines each signal line may map to a binary "bit" of a binary number which represents the signal. The value of each bit may be represented on the signal line by one of two voltages, such as a ground voltage (which may represent a binary "0") and a supply voltage (which may represent a binary "1"). As such, the value "3" may be represented on the interconnect $118_1, \ldots, 118_5$ by a ground voltage on the first signal line, a ground voltage on the second signal line and the supply voltage on the third and fourth lines (providing a binary "0011").

Figure 3:
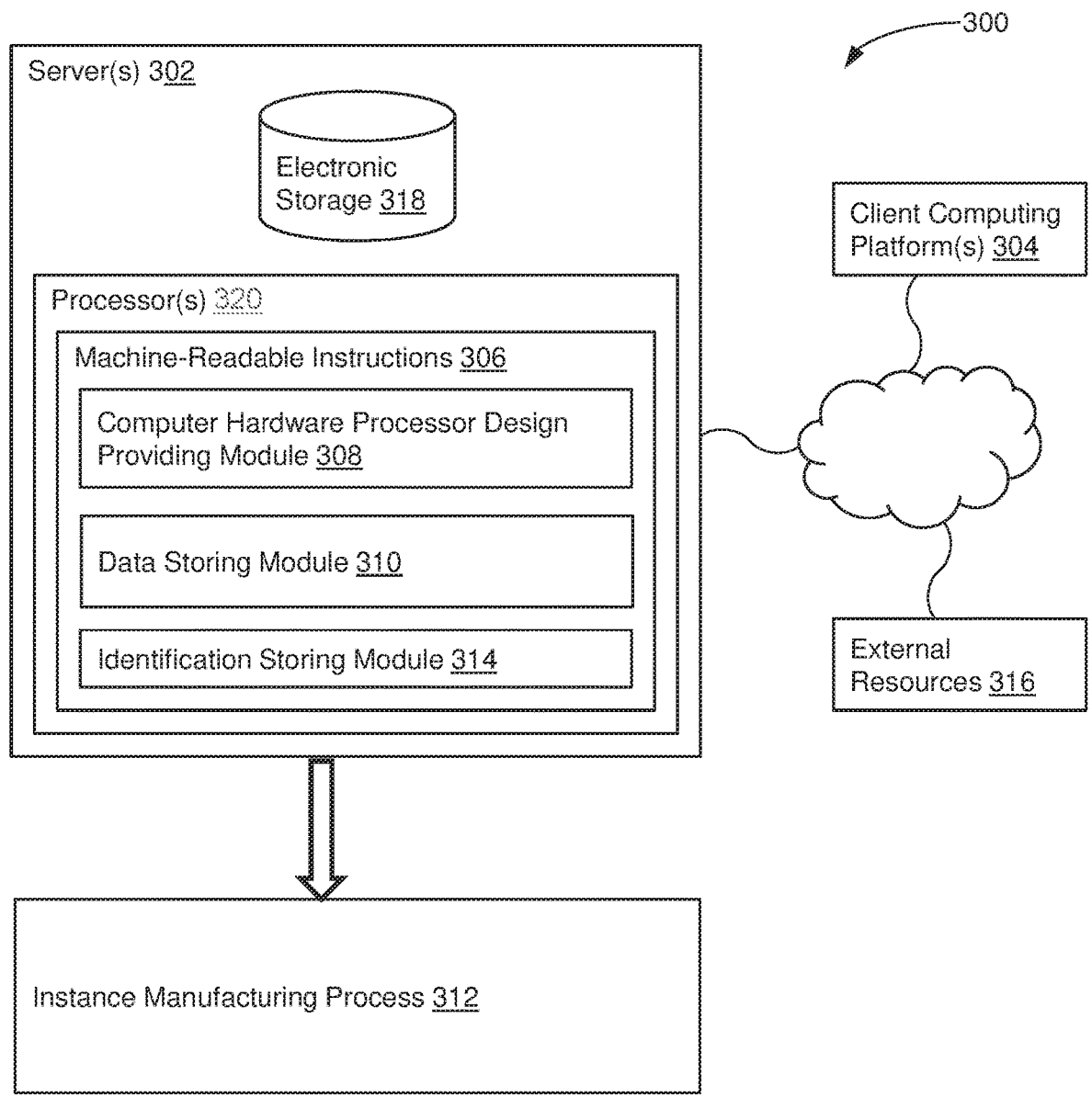
FIG. 3 is a schematic bock diagram of a system configured for creating diverse instances of an electronic hardware component, in accordance with one or more implementations.

FIG. 3 illustrates a system 300 configured for creating diverse instances of an electronic component, such as computer processing hardware, in accordance with one or more implementations. In some implementations, system 300 may include one or more servers 302. Server(s) 302 may be configured to communicate with one or more client computing platforms 304 according to a client/server architecture and/or other architectures. Client computing platform(s) 304 may be configured to communicate with other client computing platforms via server(s) 302 and/or according to a peer-to-peer architecture and/or other architectures. Users may access system 100 via client computing platform(s) 304.

Server(s) 302 may be configured by machine-readable instructions 306. Machine-readable instructions 306 may include one or more instruction modules. The instruction modules may include computer program modules. The instruction modules may include one or more of a computer hardware processor design providing module 308, a data storing module 310, an identification storing module 314, and/or other instruction modules. Server(s) 302 can be coupled, directly or indirectly with instance manufacturing process 312, which manufactures the diverse processor instances in the manner described below. However, the invention contemplates creating designs for the diverse processor instances and thus instance manufacturing process is not necessarily a part of the invention.

Design providing module 308 may be configured to provide (e.g. create or receive), in a known manner, a design for an electronic component such as a computer hardware processor having predetermined functionality. The phrase "computer hardware processor", as used herein, can refer to any electronic circuitry within an electronic system that carries out the instructions of a computer program by performing the basic arithmetic, logical, control and input/output (I/O) operations specified by the instructions. Principal components of computer hardware processor can include logic elements(s), such as an arithmetic logic unit(s) (ALU) that perform arithmetic and logic operations, processor registers that supply operands to the ALU and store the results of ALU operations and a control unit that orchestrates the fetching (from memory) and execution of instructions by directing the coordinated operations of the ALU, registers and other components. The diversification can also be applied to any chip which does not contain a computer Hardware processor or more precisely a chip which does not carry out instructions. As an example, the chip could be an AD converter or chip implementing a logic function. Therefore, the phrase "hardware processor", as used herein, encompasses any chip or other hardware the implements a logic function Electronic components can be "microprocessors", meaning they are contained on a single integrated circuit (IC) chip, such as a processing chip described above. An IC that contains a computer hardware processor may also contain memory, peripheral interfaces, and other components of a computer; such integrated devices are variously called microcontrollers or systems on a chip (SoC). Computer hardware processors can also be ASICS. An ASIC is an integrated circuit developed for a particular use, as opposed to a general-purpose device.

The design may specify a computer hardware processor, or other component, having multiple logic elements, such as ALUs. Each logic element may have at least one input and one output and interconnections connecting inputs and output of the logic elements to provide predetermined functionality to the resulting computer hardware processor.

Data storing module 310 may be configured to store a data set indicating multiple unique sets of modifications to at least some of the inputs and/or outputs of the logic elements specified by the hardware processor design. Data storing module 310 may include a memory device or may cause the data set and related information to be stored in an external memory, such as external devices 316. Instance manufacturing process 312 may manufacture a first instance of the computer hardware processor in accordance with the computer hardware processor design having a first set of the unique sets of modifications in a manner that does not affect the predetermined functionality. Instance manufacturing process 312 may also manufacture a second instance of the computer hardware processor in accordance with the computer hardware processor design having a second set of the unique sets of modifications in a manner that does not affect the predetermined functionality. The first instance of the computer hardware processor and the second instance of the hardware processor may be unique from one another and the first instance of the computer hardware processor and the second instance of the hardware processor both exhibit the predetermined functionality as required when the designer set out to implement the requirements in hardware. The first set of the unique modifications and the second set of unique modifications each may include at least one transformation and a corresponding inverse transformation.

The transformations may be any functions which have an inverse function and may be applied to inputs or outputs. At least one transformation may be formed at the output of one logic elements and the corresponding inverse transformation is formed at the input of another logic elements that is immediately downstream from the one logic elements. Each logic element may be a logic unit or cell on a chip. Each logic elements may be a chip. Each logic elements may be a PCB having multiple chips. Each chip may have multiple logic elements. Further a first instance of software may be executed by the first instance of the computer hardware processor and a second instance of software is executed by the second instance of the computer hardware processor. In other words, hardware diversification can be combined with known software diversification. The first instance of software may be different from the second instance of software and the first instance of software having the same functionality as the second instance of software. The first instance of software and the second instance of software may be diverse instances of the same software code.

Identification storing module 314 may be configured to store an identification of the first instance of the computer hardware processor in correspondence with the first set of the unique sets of modifications and storing an identification of the second instance of the computer hardware processor in correspondence with the second set of the unique sets of modifications. The modifications may provide an interlock between the logic units whereby only desired logic units can be used in combination. Identification storing module 314 can include memory for storing the identification or can cause the identification to be stored externally, such as in external resources 316.

In some implementations, instance manufacturing process may include semiconductor fabrication processes, such as electron beam lithography techniques. In some implementations, by way of non-limiting example, the logic elements may be selected from the group of registers, counters, multipliers, or latches.

In some implementations, server(s) 302, client computing platform(s) 304, instance manufacturing process 312, and/or external resources 316 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 302, client computing platform(s) 304, and/or external resources 316 may be operatively linked via some other communication media.

A given client computing platform 304 may include one or more processors configured to execute computer program modules. The computer program modules may be configured to enable an expert or user associated with the given client computing platform 304 to interface with system 100 and/or external resources 316, and/or provide other functionality attributed herein to client computing platform(s) 304. By way of non-limiting example, the given client computing platform 304 may include one or more of a desktop computer, a laptop computer, a handheld computer, a tablet computing platform, a NetBook, a Smartphone, a gaming console, and/or other computing platforms.

External resources 316 may include sources of information outside of system 100, distributed storage, external entities participating with system 100, and/or other resources. In some implementations, some or all the functionality attributed herein to external resources 316 may be provided by resources included in system 100.

Server(s) 302 may include electronic storage 318, one or more processors 320, and/or other components. Server(s) 302 may include communication lines, or ports to enable the exchange of information with a network and/or other computing platforms. Illustration of server(s) 302 in FIG. 1 is not intended to be limiting. Server(s) 302 may include a plurality of hardware, software, and/or firmware components operating together to provide the functionality attributed herein to server(s) 302. For example, server(s) 302 may be implemented by a cloud of computing platforms operating together as server(s) 302.

Electronic storage 318 may comprise non-transitory storage media that electronically stores information. The electronic storage media of electronic storage 118 may include one or both of system storage that is provided integrally (i.e., substantially non-removable) with server(s) 302 and/or removable storage that is irremovably connectable to server(s) 302 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 320, information received from server(s) 302, information received from client computing platform(s) 304, and/or other information that enables server(s) 302 to function as described herein.

Processor(s) 320 may be configured to provide information processing capabilities in server(s) 302. As such, processor(s) 320 may include one or more of a digital processor, an analog processor, a digital circuit designed to process information, an analog circuit designed to process information, a state machine, and/or other mechanisms for electronically processing information. Although processor(s) 320 is shown in FIG. 1 as a single entity, this is for illustrative purposes only. In some implementations, processor(s) 320 may include a plurality of processing units. These processing units may be physically located within the same device, or processor(s) 320 may represent processing functionality of a plurality of devices operating in coordination. Processor(s) 320 may be configured to execute modules by software; hardware; firmware; some combination of software, hardware, and/or firmware; and/or other mechanisms for configuring processing capabilities on processor(s) 320. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, and 314 are illustrated in FIG. 3 as being implemented within a single processing unit, in implementations in which processor(s) 320 includes multiple processing units, one or more of modules 308, 310, and/or 314 may be implemented remotely from the other modules. The description of the functionality provided by the different modules described below is for illustrative purposes, and is not intended to be limiting, as any of modules may provide more or less functionality than is described. For example, one or more of modules may be eliminated, and some or all of its functionality may be provided by other ones of modules.

Figure 4:
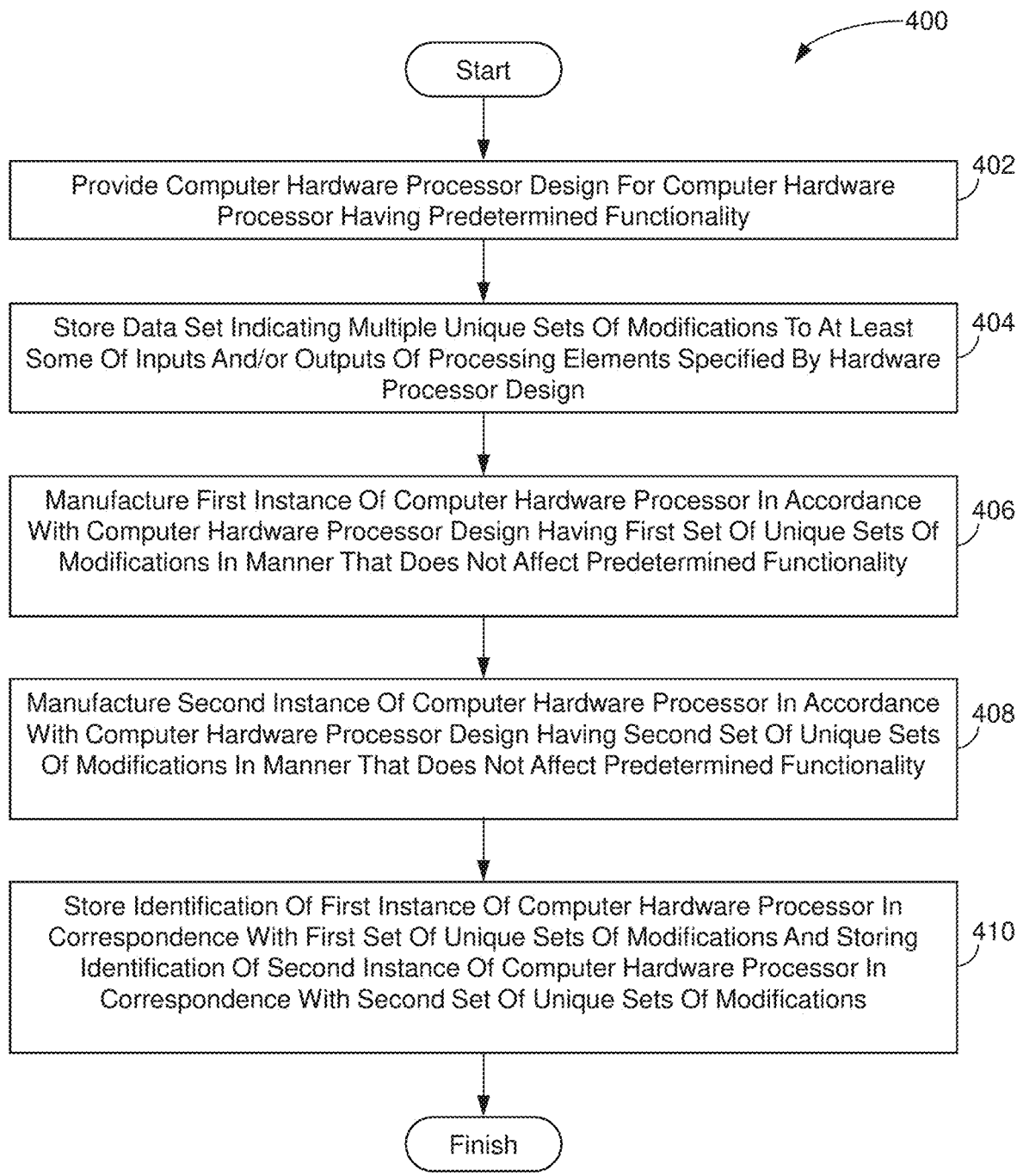
FIG. 4 is a flowchart of a method for creating diverse instances of an electronic hardware component, in accordance with one or more implementations.

FIG. 4 illustrates a method 400 for creating diverse instances of a computer processing hardware, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include providing a conventional electronic component design for a computer hardware processor having predetermined functionality. The computer hardware processor design may specify a computer hardware processor having multiple logic elements. Each logic element may have at least one input and one output and interconnections connecting inputs and output of the logic elements to provide predetermined functionality to the resulting computer hardware processor. Operation 402 may be performed by one or more hardware processors configured by machine-readable instructions including a module that is the same as or similar to computer hardware processor design providing module 308, in accordance with one or more implementations.

An operation 404 may include storing a data set indicating multiple unique sets of modifications to at least some of the inputs and/or outputs of the logic elements specified by the hardware processor design. Operation 404 may be performed by one or more hardware processors configured by machine-readable instructions including a module that is the same as or similar to data storing module 310, in accordance with one or more implementations.

An operation 406 may include manufacturing a first instance of the computer hardware processor in accordance with the computer hardware processor design having a first set of the unique sets of modifications in a manner that does not affect the predetermined functionality. Operation 406 may be performed by manufacturing process 312, in accordance with one or more implementations. Manufacturing process 312 can be separate from, and need not be included in, the invention.

An operation 408 may include manufacturing a second instance of the computer hardware processor in accordance with the computer hardware processor design having a second set of the unique sets of modifications in a manner that does not affect the predetermined functionality. Operation 408 may be performed by manufacturing process 312, in accordance with one or more implementations.

An operation 410 may include storing an identification of the first instance of the computer hardware processor in correspondence with the first set of the unique sets of modifications and storing an identification of the second instance of the computer hardware processor in correspondence with the second set of the unique sets of modifications. Operation 410 may be performed by one or more hardware processors configured by machine-readable instructions including a module that is the same as or similar to identification storing module 314, in accordance with one or more implementations. The method need not include the manufacturing process and can result in the creation of multiple computer hardware processor designs that specify the diverse instances of hardware.

The embodiments provide a silicon manufacturing process where every hardware processor can contain unique data and logic without the need for separate back-end personalization steps. Individualized processors can be created without the need for non-volatile memory, resulting in significant cost savings. All security sensitive operations can be concentrated in one trusted environment. Processor design reverse engineering through delayering can be rendered impractical. Resistance to side channel leakage of cryptographic algorithms is also provided. Glitch attacks on cryptographic algorithms and decision logic are also prevented. Because every instance is different, every chip needs to be attacked as if it were the first attack. Put another way the invention allows protection against so called class attacks by allowing each individual hardware processor (or chip) to be different.

Figure 5:
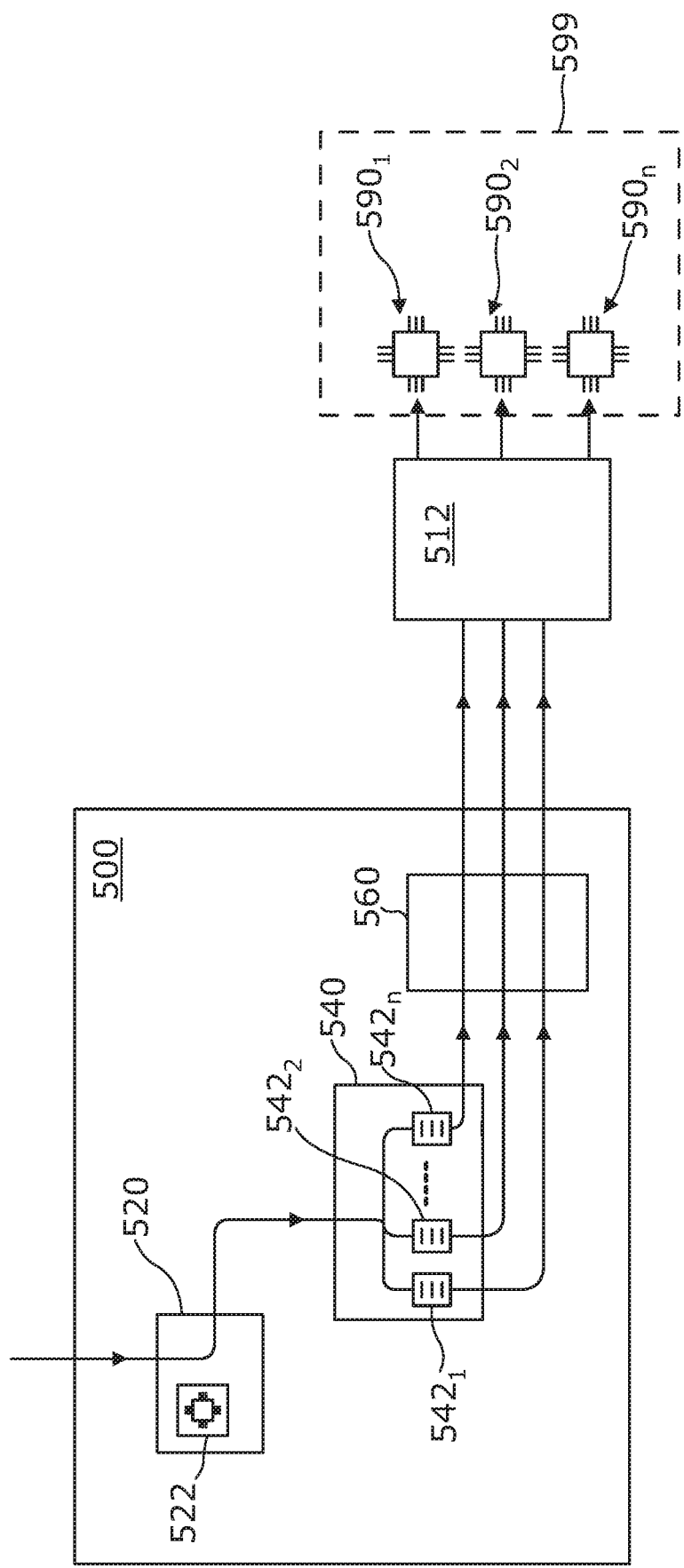
FIG. 5 schematically illustrates a variant system for producing individualized processing chips.

FIG. 5 schematically illustrates an alternative system 500 for producing individualized (or diversified) processing chips $590_1$, $590_2$, ..., $590_n$. FIG. 5 shows three such individualized processing chips $590_1$, $590_2$, ..., $590_n$, however for ease of understanding the following discussion shall refer to the individualized processing chips $590_1$, $590_2$, ..., $590_n$ in the singular using the reference numeral $590_N$. The system 500 may be implemented with (or embodied on) one or more computing systems, such as one or more servers 302 as described above. The system 500 comprises a design reception module 520, a design individualization module 540, and an individualized design provision module 560. Also shown in FIG. 5 is a chip fabrication system 512.

The design reception module 520 is arranged to receive a processing chip design 522. The reception module 520 may be arranged to receive the processing chip design 522 from a storage, such as the electronic storage 318 of the server 302. However, it will be appreciated that the reception module 520 may be arranged to receive processing chip design 522 from any suitable source, including an external data storage device, a cloud computing service, a client computing platform 304, external resources 316 etc. The reception module 520 may be arranged to receive a processing chip design 522 input by a user of the system 500. For example the system 500 may also comprise a design providing module 308 as described previously. The design providing module 308 may be arranged to facilitate (or allow or otherwise enable) the user to create the processing chip design 522. The design providing module 308 may implement (otherwise be or be interfaced to) processing chip design authoring tools (typically known as Electronic Design Automation tools) as would be well known to those skilled in the art. Examples of such tools include Synopsis, Cadence, and others.

A common processing operation is specified, at least in part, by the processing chip design 522. The common processing operation is a processing operation that each individualized chip $590_N$ based on the processing chip design 522 is arranged to perform. In this way it will be appreciated that the processing chip design 522 specifies at least part of the functionality of the resulting processing chips $590_N$. The processing chip design 522 may specify logic cells 206, ..., 216 to be included as part of a resulting processing chip. The processing chip design 522 may specify some or all of the interconnects 118 between logic cells 206, ..., 216 of a resulting processing chip. The processing chip design 522 may be thought of as specifying some or all of the circuit layout(s) of a resulting processing chip $590_N$. The processing chip design 522 may take the form of, or comprise any of (or any combination of): one or more integrated circuit layouts (or mask layouts or mask designs), pseudocode, one or more netlists, one or more hardware description representations. The processing chip design may be represented in any combination of well-known representations, such as bitmap images (which may represent integrated circuit layouts), VHDL, Verilog, GDSII, etc. The processing chip design 522 may specify one or more configurable blocks as discussed shortly below.

The design individualization module 540 is arranged to produce an individualized processing chip design $542_1$, $542_2$, ..., $542_n$ based on the processing chip design 522. FIG. 5 shows three such individualized processing chip designs $542_1$, $542_2$, ..., $542_n$, however for ease of understanding the following discussion shall refer to the individualized processing chip designs $542_1$, $542_2$, ..., $542_n$ in the singular using the reference numeral $542_N$. The design individualization module 540 is arranged to include, as part of the individualized processing chip design $542_N$, a set of modifications that implement an individualized set of transformations. It will be appreciated that the design individualization module 540 may produce a plurality of individualized processing chip designs $542_1$, $542_2$, ..., $542_n$, based on the processing chip design 522. Typically, each individualized processing chip design $542_1$, $542_2$, ..., $542_n$ includes a respective set of modifications that implement an individualized set of transformations for said individualized processing chip design $542_1$, $542_2$, ..., $542_n$. The individualized set of transformations implemented in one individualized processing chip design $542_1$ is different to the individualized set of transformations for at least one other processing chip design individualized processing chip design $542_2$. In some embodiments, the individualized set of transformations implemented in each individualized processing chip design $542_1$ is different to the individualized set of transformations implemented in each other individualized processing chip design $542_2$. In this way it may be understood that in some embodiments the individualized set of transformations is specific to the corresponding individualized processing chip design $542_N$.

The individualization module 540 may be arranged to receive the set of modifications for including in an individualized processing chip design $542_N$ from a storage, such as the electronic storage 318 of the server 302. However, it will be appreciated that the individualization module 540 may be arranged to receive the set of modifications for including in an individualized processing chip design $542_N$ from any suitable source, including an external data storage device, a cloud computing service, a client computing platform 304, external resources 316 etc. Additionally, or alternatively the individualization module 540 may be arranged to receive the set of modifications for including in an individualized processing chip design $542_N$ input by a user of the system 500. For example the system 500 may also comprise a design providing module 308 as described previously. The design providing module 308 may be arranged to facilitate (or allow or otherwise enable) the user to create the set of modifications for including in an individualized processing chip design $542_N$, for example through the use of processing chip design authoring tools as described previously.

An individualized set of transformations comprise one or more transformations, such as the transformations described previously. A transformation may be thought of as defining a mapping between a set of input values and a set of output values. Each transformation is invertible (or bijective). It will be appreciated that for some transformations (such as a logical NOT operation) the transformation may be its own inverse transformation. As such, each transformation has a corresponding inverse transformation. A transformation is typically intended to transform signals on an interconnect of the chip $118_1, \ldots, 118_5$. A transformation may be (or comprise) a transformation of a signal representation of signals on a given interconnect of the chip $118_1, \ldots, 118_5$. It will be appreciated that such a transformation would in effect be altering the signal mapping for the interconnect $118_1, \ldots, 118_5$. A transformation may be or comprise a logical transformation. It will be appreciated that the transform may be a simple logical transformation, for example applying NOT gate(s) to one or more signal lines and/or applying an XOR gate(s) to pair(s) of signal lines etc. The transformation may be a more complex logical transform involving the chaining together of a number of logic gates (such as in the 3×3 bijection example described shortly below).

Such a signal transformation may comprise (or be) any of: comprise any of: one or more a logical operations being applied to one or more signal lines; a permutation of two or more signal lines; a linear formula being applied to a signal value carried by the corresponding logic cell interconnect; a non-linear formula being applied to a signal value carried by the corresponding logic cell interconnect etc.

Additionally, or alternatively, a transformation may comprise a transformation of the data carried across an interconnect $118_1, \ldots, 118_5$. In particular, the transformation may operate on groups of successive signals (such as signals that are successive in time) carried on the interconnect. In this way a data representation of the signals on an interconnect may be transformed. For example, a transformation may comprise applying a cipher (such as a stream cipher) to the data carried across an interconnect.

A transformation may itself comprise more than one transformation applied in succession (or chained together). As such, any transformation may be used providing that the transformation is invertible.

An individualized set of transformations are arranged such that when they are implemented in the individualized processing chip design $542_N$ the common processing operation of the individualized processing chip design $542_N$ is preserved. In this way the resulting individualized processing chip $590_N$ is arranged to carry out the common processing operation. The individualized set of transformations may be arranged such that when they are implemented in the processing chip design $542_N$ an overall transformation is applied to the input and/or output of the common processing operation. In this way the resulting individualized processing chip $590_N$ is arranged to carry out the common processing operation with the overall transformation being applied to the input and or output of the common processing operation. As such, it will be appreciated that the set of transforms when implemented in the individualized processing chip design $542_N$ preserve the functionality of the resulting individualized chip $590_N$ (to within an overall transformation operation).

Typically, at least one transformation of the individualized set of transformations is compensated for by one or more other transformations in the individualized set of transformations. It will be understood that a number of transformations may be said to compensate for a given transformations if the cumulative effect of applying the number of transformations is equivalent to the inverse of the given transformations. In this way each of the number of transformations at least partially inverts the given transformations.

For example, a given transformation $T(x)$ may be given by $(x) \equiv F(G(x))$. The transformation $F^{-1}(y)$ which is the inverse of $F(y)$ would be a compensating transformation with respect to $T(x)$. Similarly the transformation $G^{-1}(y)$ which is the inverse of $G(y)$ would be a compensating transformation with respect to $T(y)$. In this case the cumulative effect of $F^{-1}(y)$ and $G^{-1}(y)$, applied as $F^{-1}(G^{-1}(x))$ would invert $T(x)$.

In some embodiments the individualized set of transformations comprise one or more pairs of transformations, wherein for each pair of transformations one of the pair of transformations is the inverse of the other transformation of the pair. In some further embodiments for a pair of transformations one of the pair of transformations is for one end of the interconnect $118_1, \ldots, 118_5$ and one transformation for another end of the interconnect $118_1, \ldots, 118_5$. In this way an initial signal output by a logic cell at one end of the transformation in transformed for transmission along the interconnect $118_1, \ldots, 118_5$. The inverse transformation is applied to the transformed signal at the other end of the interconnect $118_1, \ldots, 118_5$ such that a logic cell $206, \ldots, 216$ at this other end receives the initial signal. It will be appreciated that transformations may be implemented at or near to interfaces between logic cells $206, \ldots, 216$ and interconnects $118_1, \ldots, 118_5$. In particular the transformation may be implemented within the logic cell $206, \ldots, 216$ at the interface, or as part of the interconnect $118_1, \ldots, 118_5$ at the interface. However, transformations may be implemented at any suitable point. Transformations may be implemented at any point along a given interconnect $118_1, \ldots, 118_5$ between two or more logic cells $206, \ldots, 216$.

The set of modifications is arranged to implement a corresponding individualized set of transformations when included as part of the individualized processing chip design $542_N$. The modification (or modifications) that implement a given transformation may implement the transform directly (or in full). For example, the transform may swap (or interchange or permute) two signal lines of an interconnect. Here the modification may swap the two signal lines at the point where the interconnect connects to the corresponding logic cell. The modification (or modifications) that implement a given transformation may implement the transform indirectly (or in part). As set out above a processing chip design $542_N$ may specify configurable blocks. A configurable block may comprise a partial logic circuit that enables any one of a number of transforms to be implemented. The transform implemented by the configurable block may be selected by how the partial logic circuit is completed. The modification (or modifications) that implement a given transformation may implement the transform partially, such as in conjunction with a configurable block. The modification(s) may be modification(s) that complete the configurable block.

The set of modification's may comprise any of: modifications to one or more circuit layouts of the processing chip design, modifications to one or more netlists of the processing chip design, modification to hardware description language code forming part of the processing chip design $542_N$. The set of modifications may comprise (or result in or otherwise specify) any of: inclusion of additional VIAs in a chip layout, removal of one or more VIAs, substitution of one or more VIAs specified by the processing chip design $542_N$ for one or more further VIAs, changes to one or more signal lines, inclusion of additional logic gates, modification of existing transistor structures, inclusion of additional transistors, connecting one or more existing VIAs to other elements of the circuit wiring, etc. In the case of VIAs it will be appreciated that the configurable block may include VIAs (or VIA like structures or parts thereof) that are not connected to other system wiring. A modification may therefore include connecting an existing (typically unconnected) VIA (or VIA like structure) to the system wiring. In some cases inclusion of such VIA like structures in the configurable block may be advantageous as they may be used to allow automated circuit optimization tools to be applied to the design before the modifications are applied, without any optimizer disrupting the possible VIA positions. It will be appreciated that different modifications may be more easily made in different parts of the processing chip design. For example, VIAs may be added to, or changed, directly to chip layouts of the processing chip design. Additional logic gates may be more easily introduced by changing netlists, or hardware description language code forming part of the processing chip design. In some embodiments modifications may comprise setting (or blowing) one or more one time programmable (OTP) elements such as OTP fuses and/or antifuses.

The individualized design provision module 560 is arranged to provide (or transmit) the individualized processing chip design(s) 542N for fabrication of individualized processing chip(s) 590N according to the individualized processing chip design(s). The individualized design provision module 560 may be connected to a fabrication system 512. The fabrication system 512 may be a system arranged to fabricate individualized processing chip(s) 590N according to the individualized processing chip design(s). The individualized design provision module 560 may be arranged to provide the individualized processing chip design(s) 542N to the fabrication system 512. The individualized design provision module 560 and the fabrication system 512 may be arranged to communicate with each other over, or via, an electronic communication link (or links) as described previously or any kind of network suitable for transmitting or communicating data from individualized design provision module 560 and the fabrication system 512. For example, the network could comprise one or more of: a local area network, a wide area network, a metropolitan area network, the internet, a wireless communications network, a cable network, a digital broadcast network, a satellite communication network, a telephone network, etc. It will also be appreciated that the individualized design provision module 560 may be arranged to provide the individualized processing chip design(s) 542N in an off line or batch wise manner. The individualized design provision module 560 may be arranged to store the individualized processing chip design(s) on any suitable storage media such as electronic storage 318, or any suitable storage device—for example, one or more of an optical disc, a magnetic disc, a solid-state-storage device, etc. In this way the connection may comprise providing the storage media to the fabrication system 512. The individualized design provision module 560 and the fabrication system 512 may communicate via any suitable communication mechanism/protocol in order to communicate data with each other. The connection between individualized design provision module 5060 and the fabrication system 512 may be secured, such as by known cryptographic techniques, involving encryption and/or cryptographic signing of data exchanged over the connection. Similarly if physical storage media is used as part of the connection data thereon may be secured, such as by known cryptographic techniques, involving encryption and/or cryptographic signing of data exchanged over the connection.

The fabrication system 512 may comprise one or more fabrication devices used in the production of processing chips. The fabrication system 512 may comprise systems and devices suitable for carrying out mask based photolithography. Additionally, or alternatively the fabrication system 512 may comprise systems and devices suitable for carrying out electron-beam (also known as e-beam) lithography. The fabrication system 512 may be part of, or comprise all or part of a semiconductor foundry. It will be appreciated that the system 500 described above may itself be part of, or co-located with, the fabrication system 512. The system 500 described above may be remote from the fabrication system 512. As set out previously, the invention contemplates creating individualized processing chip designs $542_N$ and thus the fabrication system 512 is not necessarily a part of the invention.

The system 500 may optionally comprise an identification storing module, such as the identification storing module 314 described previously. In particular, the identification storing module 314 may be configured to store an identification of an individualized processing chip $590_N$ (and/or an individualized processing chip design $542_N$) the respective set of modifications. The identification may be or comprise any one or more of: a text and/or number string, a hash value (such as a hash relating to the modifications and/or transformations), a binary string, or any other suitable identification. The identification may encode or represent information regarding the individualized chip design, such as the modifications in the design, the set of transformations, the provenance of the design etc. Additionally, or alternatively, the identification storing module 314 may be configured to store an identification of an individualized processing chip $590_N$ (and/or an individualized processing chip design) in correspondence with the individualized set of transformations for the individualized processing chip $590_N$. Where the individualized transforms implement a respective overall transform applied to the common processing operation of an individualized chip, the identification storing module 314 may be configured to store an identification of an individualized processing chip $590_N$ (and/or an individualized processing chip design) in correspondence with the respective overall transform. The identification storing module 314 can include memory for storing the identification or can cause the identification to be stored externally, such as in external resources 316. Additionally, or alternatively the identification of an individualized processing chip may be stored on or as part of the individualized chip. The identification may be printed (or etched or otherwise indicated) on the individualized chip itself. The identification may be stored on the individualized chip. The identification may be stored, at least in part, on the individualized chip using programmable read-only memory. Additionally or alternatively, the identification may be stored, at least in part, on the individualized chip using one or more modifications included in the individualized design, such as those described above. The individualized chip may provide an interface or other mechanism to allow a device to interrogate the individualized chip and retrieve the identification. Such an interface may be secured against unauthorized access.

Such features are particularly advantageous where overall transformations of individualized processing chips $590_N$ are used to interlock the individualized chips to specific items of hardware (as described shortly below). This enables failed individualized chips to be replaced with individualized chips having the same overall transformation, thus preserving the functionality of the respective device.

In some embodiments, implementations may leverage e-beam lithography a part of manufacturing process 312 (or fabrication system 512). One or more circuit layouts from (or generated by) the processing chip design 522 may be applied by the fabrication system 512 using mask based photolithography (as described previously). Some or all of the set of modifications included in the individualized processing chip design(s) may be applied using e-beam lithography. In other words some or all of the circuit layout (or layouts) common to the individualized processing chip designs $542_N$ may be applied (or realized) in the individualized processing chip(s) $590_N$ using mask based lithography. Similarly some or all of the modifications, typically specific to each individualized processing chip design $542_N$ may be applied (or realized) in the individualized processing chip(s) $590_N$ using e-beam based lithography. In this way the advantages of mask based lithography (such as increased throughput) be obtained for manufacturing circuits on the individualized processing chips $590_N$, whilst individualization, through the modification's, can be obtained using the e-beam process, avoiding the need to make numerous costly masks corresponding to the different modifications.

Known implementations of e-beam lithography include the Mapper™ process and equipment. The technology typically produces superior results compared to standard lithography techniques in the areas of resolution and depth of focus. In some embodiments the e-beam lithography process may deploy many thousands of low-power parallel electron beamlets, and use arrayed electron optics to guide these beamlets in groups of 49 from source to wafer. The electron optics includes a transmissive blanking module that can switch each beam independently on or off at very high speeds. After modulation, an array of electron optical microlenses focuses the beamlets in Gaussian spots of 25 nm each. The wafer is brought into the focal plane and scanned underneath. Such a technique is advantageous as it allows the introduction of high levels of current onto the wafer whilst avoiding the Coulomb interactions or electron repulsions that may otherwise blur the pattern. This in turn provides for improved throughput of the e-beam process, allowing individualized chips to be manufactured and an improved rate.

High-resolution patterning without a mask can be leveraged for individualizing each chip on a wafer in accordance with the methods described above. Direct write lithography allows each individual hardware processor to be customized at the smallest possible physical level, as there is no mask involved in the manufacturing step that enforces the same pattern to be printed across the entire surface of a wafer. While the existing manufacturing steps can stay the same, individual processor features such as VIAs, gates, or metal wires can be varied for each chip, making the work of physically attacking the device significantly more complicated. By employing as many as 65,000 beamlets in parallel the commercial feasibility of manufacturing such individualized integrated circuits is greatly improved.

Figure 6:
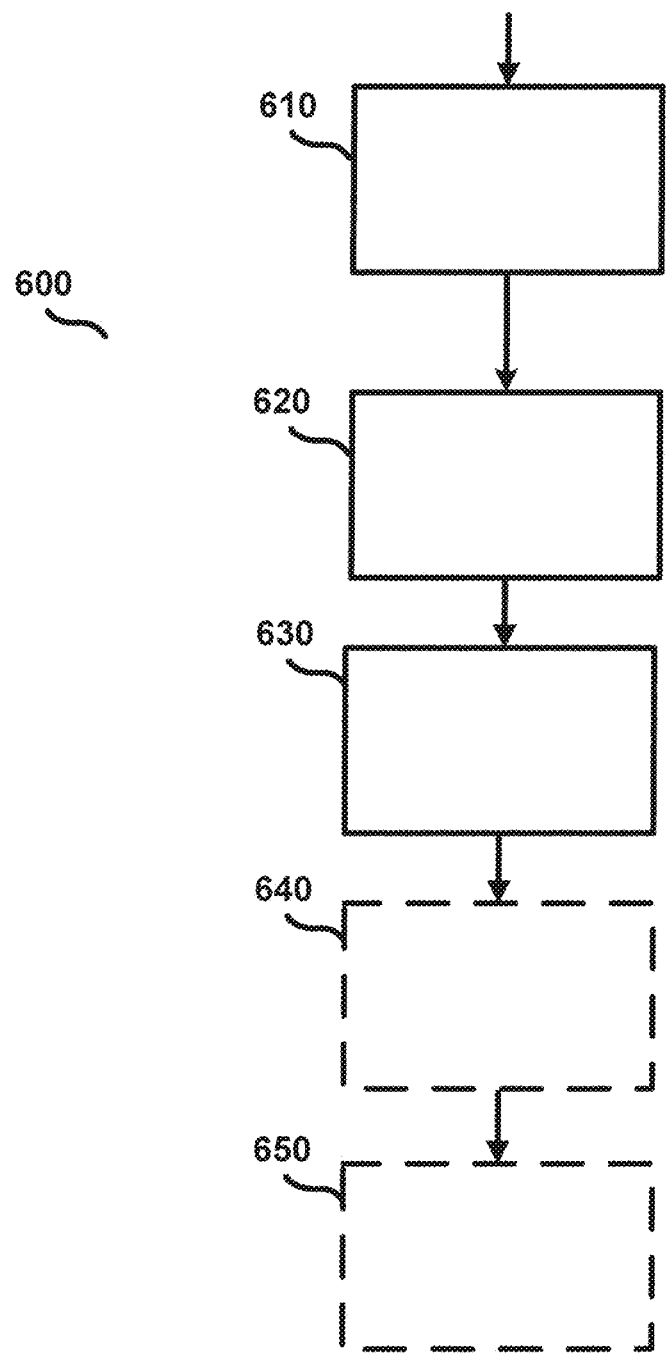
FIG. 6 is a flowchart of a method for producing individualized processing chips, each individualized processing chip being arranged to carry out a common processing operation, in accordance with one or more implementations.

FIG. 6 schematically illustrates a method 600 for producing individualized processing chips, each individualized processing chip being arranged to carry out a common processing operation, in accordance with one or more implementations. The method 600 may be carried out by the system 500 as described above with reference to FIG. 5. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At a step 610 the method comprises receiving a processing chip design 522, wherein a common processing operation is specified, at least in part, by the processing chip design 522. The step 610 may be performed by one or more hardware processors configured by machine-readable instructions including a module that is the same as or similar to the design reception module 520, in accordance with one or more implementations.

At a step 620 the method comprises individualizing the processing chip design 522 to produce an individualized processing chip design 542N, in accordance with an individualized set of transformations for the individualized processing chip 590N, by including a respective set of modifications as part of the individualized processing chip design 542N that implement the individualized set of transformations. Each transformation of the individualized set of transformations may be a transform for an interconnect, specified in the processing chip design 542N, of at least two logic cells specified in the processing chip design. The step 620 may be performed by one or more hardware processors configured by machine-readable instructions including a module that is the same as or similar to the design individualization module 540, in accordance with one or more implementations.

At a step 630 the method comprises providing the individualized processing chip design 542N for fabrication of an individualized processing chip 590N according to the individualized processing chip design 542N. The step 630 may be performed by one or more hardware processors configured by machine-readable instructions including a module that is the same as or similar to the individualized design provision module 560, in accordance with one or more implementations.

At an optional step 640 the method may comprise fabricating an individualized processing chip $590_N$ according to the individualized processing chip design $542_N$. The step 640 may also comprise manufacturing one or more copies of the individualized processing chip $590_N$ according to the individualized processing chip design $542_N$. The step 640 may be performed by the fabrication system 512, in accordance with one or more implementations. As set out previously the fabrication of the individualized chips $590_N$ can be separate from, and need not be included in, the invention. As such, the step 640 is presented as being optional.

At an optional step 650 the method may comprise storing an identification of the individualized chip in correspondence with either: (a) the respective set of modifications or (b) the individualized set of transformations for the individualized processing chip $590_N$. The step 650 may comprise storing an identification of the individualized processing chip $590_N$ (and/or the individualized processing chip design) in correspondence with a respective overall transform of the individualized processing chip $590_N$ (or individualized processing chip design). The step 650 may be performed by one or more hardware processors configured by machine-readable instructions including a module that is the same as or similar to the identification storing module 314, in accordance with one or more implementations.

It will be appreciated that the step 620 and the step 630 (optionally including either or both of the steps 640 and 650) may be repeated for each individualized processing chip $590_N$, or each individualized processing chip design $542_N$ required without requiring the step 610 to be repeated. These repeated steps may be carried out in serial or parallel. In this way a batch 599 of individualized processing chips $590_N$ may be produced. In particular each individualized processing chip $590_N$ of the batch is arranged to carry out a common processing operation. Further each individualized processing chip $590_N$ or the batch 599 comprises a plurality of logic cells common to the plurality of individualized processing chips $590_N$, a plurality of interconnects common to the plurality of individualized processing chips $590_N$ and a respective set of modifications that implement an individualized set of transformations for the individualized processing chip. Each interconnect of the plurality of interconnects is arranged to connect two or more respective logic cells of the plurality of logic cells. Each transformation of the individualized set of transformations for the individualized processing chip $590_N$, is a transform for a respective interconnect of the plurality of interconnects. It will also be appreciated that individualized set of transformations for one individualized chip is different to the individualized set of transformations for at least one other individualized chip $590_N$.

Figure 7A:
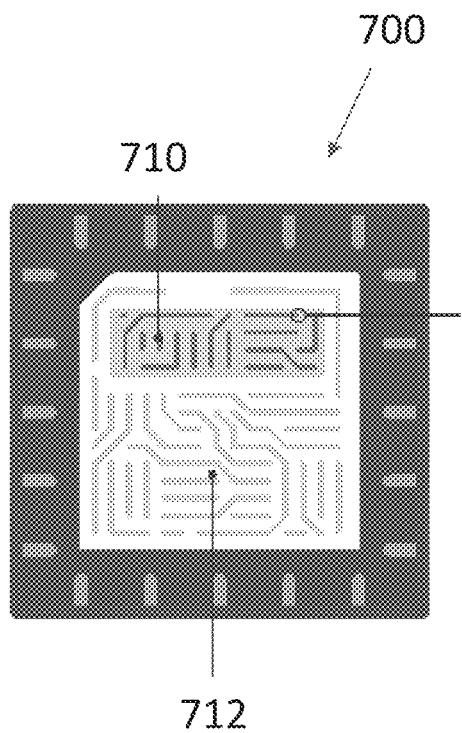
FIGS. 7a and 7b illustrate one example of a diverse (or individualized) chip.
Figure 7B:
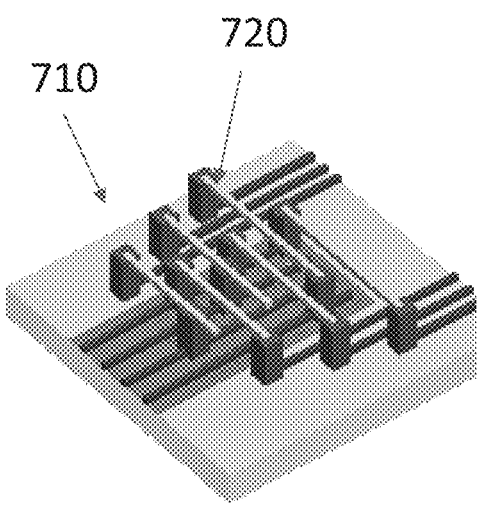

FIGS. 7a and 7b illustrate a basic approach for diversifying (or individualizing) hardware processors or processing chips. Unique area 710 of a chip 700 is individualized by selectively printing VIAs 720 between two adjacent metal layers. Common area of the chip 712 can be identical for multiple chips. This allows unique values, such as an identity or a cryptographic key, to be printed during the front-end manufacturing process.

Figure 8:
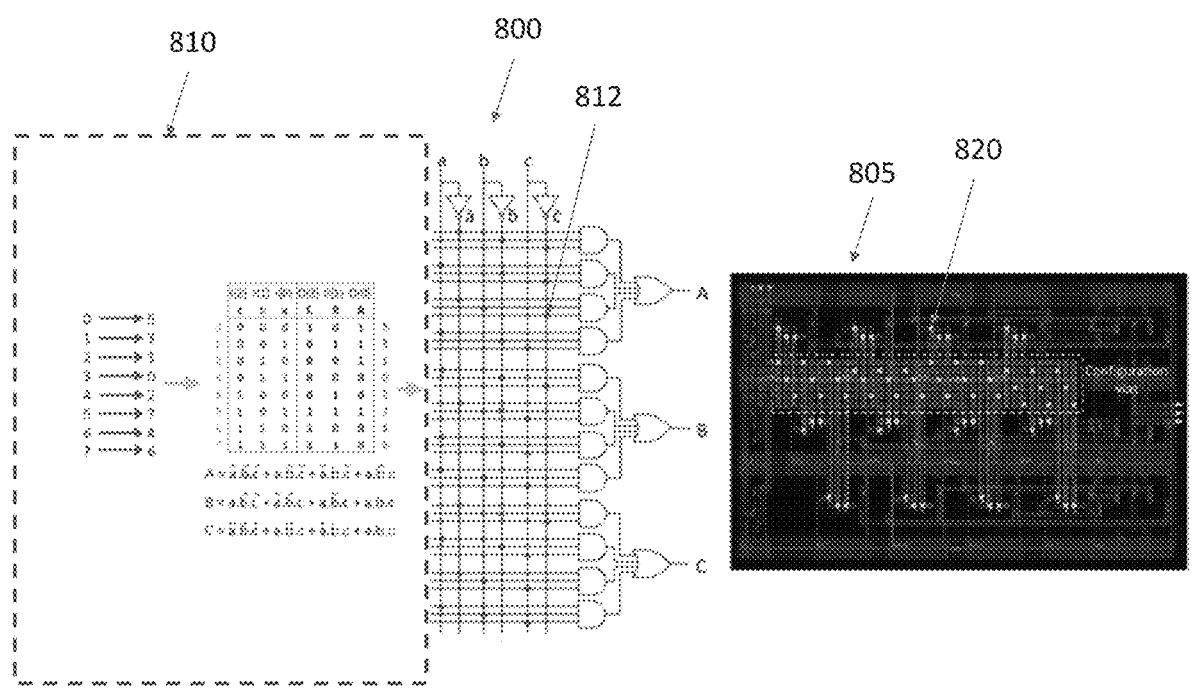
FIG. 8 illustrates an example of data structure and logic diagram of a diverse chip.

A similar approach can be used to selectively print other structures used in chip design, which allows data and logic to be individualized at chip level, resulting in highly differentiated circuits. FIG. 8 illustrates an example of configurable block such as discussed above with reference to FIG. 5. FIG. 8 shows a logical representation of the configurable block 800 in terms of logic gates. Here three input signal wires a, b, c are shown along with three output signal wires A, B, C. The configurable block 800 is arranged to allow any 3×3 bijective transform to be applied to the signal representation of the three input wires. A circuit layout representation of the configurable block 820 is also shown in FIG. 8.

The dots 812 indicate where two intersecting wires of the logical representation of the configurable block 800 are connected. It is these connections which determine which 3×3 bijection the block carries out. The particular 3×3 bijection selected by the dots 812 (only one of which is labeled for reasons of clarity) is shown in the tables 810 of FIG. 8. This shows the mapping between the signal values 0-7 possible on the 3 bit binary input provided by the input signal wires a,b,c and which output values they are mapped to be carried on the output signal wires A, B, C again as a three bit binary number. A circuit layout representation of the configurable block 805 is also shown in FIG. 8. The dots 812 correspond to VIAs 820 (again, only one of which is labeled for reasons of clarity) introduced in the circuit layout 805. These VIAs form the modifications (as discussed previously) that would specify this particular 3×3 bijection.

Generally, software is more vulnerable and easier to attack than hardware. As noted above, uniquely diversified software can be entangled or locked to uniquely diversified hardware. Without knowing what unique data transformations have been encoded into both the hardware and the software, it will be very difficult for an attacker to lift data or software from one device and use that on another.

Implementing uniquely parameterized ciphers in hardware processors significantly reduces the amount of key material that is leaked from a chip via so called side channels. Security is further enhanced through keys embedded directly in the wiring of the chip, as the key is never directly used for leaky computations as is the case with standard hardware implementations.

The process of extracting data and logic from a chip through traditional reverse engineering techniques is significantly more complicated when each chip is uniquely diversified. The common process of shaving or grinding, commonly called "delayering", a chip layer-by-layer, taking photos, and stitching these photos back together to reveal the design typically requires many instances of the same chip to be attacked in order to reveal the complete design. Diversified hardware processors can render this type of attack impractical.

A trusted unique identity and secret cryptographic keys can manage the security of a device throughout its entire lifecycle. This data can be stored in data storing module 310 and/or identification storing module 314 of FIG. 3. The benefits described above can be used to provide a reliable mechanism to address individual chips and support secure life-cycle functionality such as device activation, secure provisioning and configuration, guaranteed firmware resets, secure firmware updates, device blacklisting, and support for the end-of-life process of devices. As noted above, e-beam lithography can be used in the instance manufacturing process 312. To integrate an electron beam system into a standard CMOS flow, both the Electronic Design Automation (EDA) flow and the resist process flow should be compatible with common practices.

Traditional EDA tools can be used to prepare the conventional design (such as processing chip design 522) and/or the respective sets of modifications (which may be presented as data for an e-beam system to apply to the processing chip design 522). The design can be flattened, proximity corrected, and fractured in a known manner. The proximity correction may be e-beam specific and different from the mechanism used for optical proximity correction. It can be described by a two-Gaussian model for forward and backscatter electrons, and the impact on the imaging can be corrected for. For example, in case of 5 keV electrons the scattering area is relatively small, typically several hundreds of nanometers and therefore calculation times are short.

Figure 9:
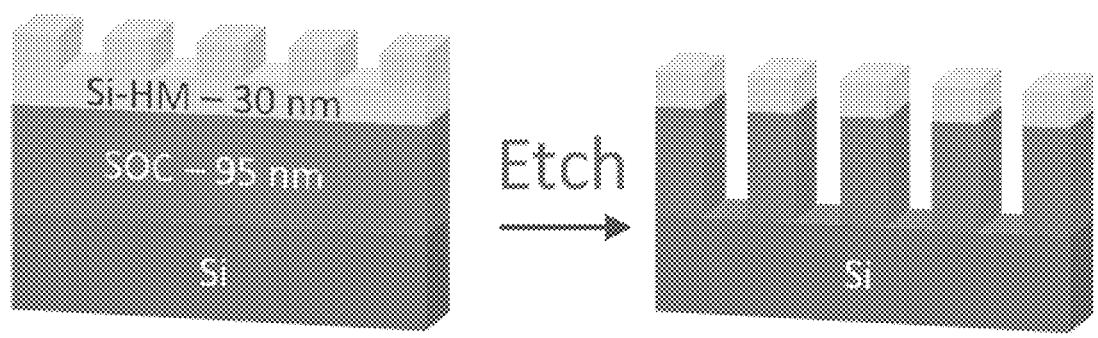
FIG. 9 illustrates an etched stack in accordance with one or more implementations.

Conventional e-beam resists such as PMMA and ZEP are typically not allowed in CMOS fabrication facilities. The same chemistries as used for Deep Ultraviolet (DUV) lithography are preferably used. In case of a 5 keV e-beam, the resist layer is preferably relatively thin, usually in the order of the resolution one tries to print. Since, for etching, an aspect ratio of 3-5 is required, a tri-layer stack with a hard mask has been developed just as is used for advanced optical lithography as shown in FIG. 9.

Figure 10:
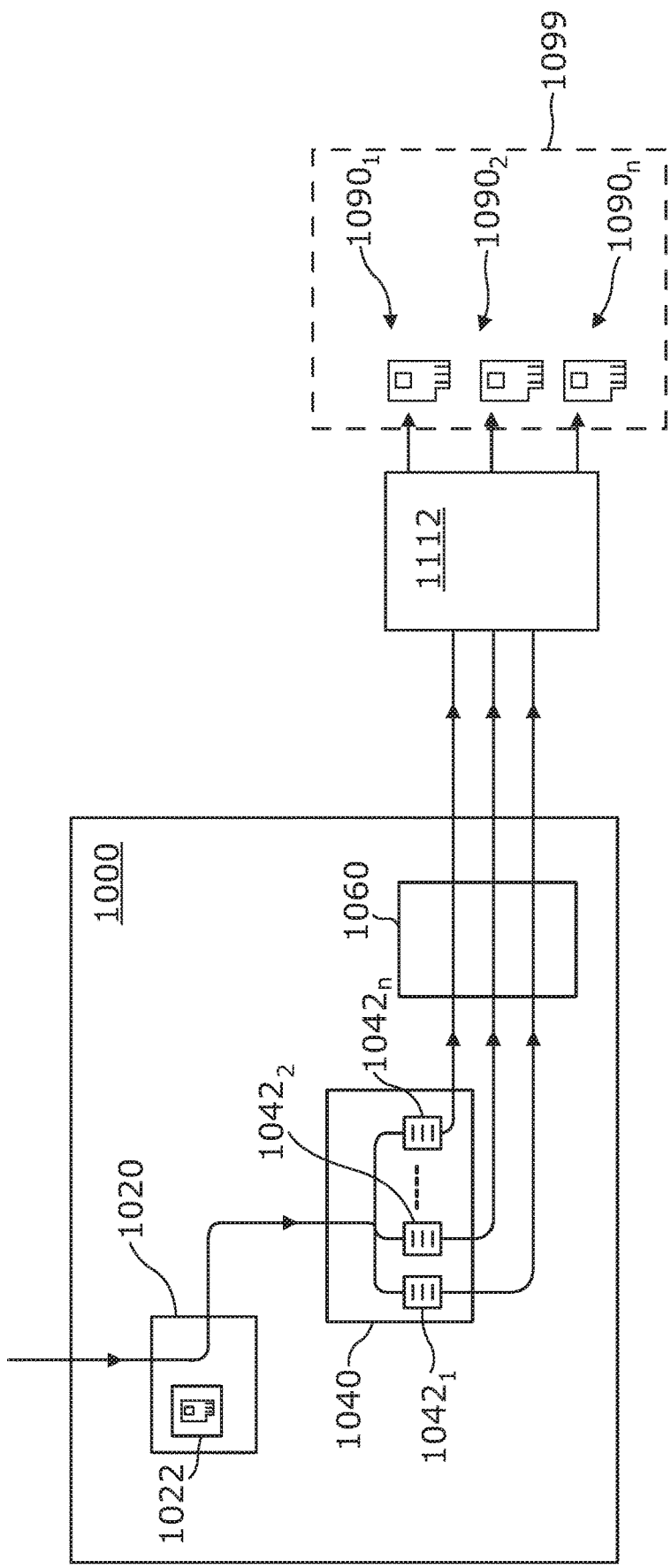
FIG. 10 schematically illustrates a system for producing individualized electronic processing assemblies, such as those using the individualized processing chips of FIGS. 5 and 6.

FIG. 10 schematically illustrates a system 1000 for producing individualized electronic processing assemblies 10901, 10902, . . . , 1090n. The system 1000 may be implemented with (or embodied on) one or more computing systems, such as one or more servers 302 as described above. FIG. 10 shows three such individualized electronic processing assemblies $1090_1$, $1090_2$, ..., $1090n$, however for ease of understanding the following discussion shall refer to the individualized electronic processing assemblies $1090_1$, $1090_2$, ..., $1090n$ in the singular using the reference numeral 1090. The system 1000 comprises an electronic processing assembly design reception module 1020, an electronic processing assembly design individualization module 1040, and an individualized electronic processing assembly design provision module 1060. Also shown in FIG. 10 is an assembly fabrication system 1112.

The electronic processing assembly design reception module 1020 is arranged to receive an electronic processing assembly design 1022. The reception module 1020 may be arranged to receive the electronic processing assembly design 1022 from a storage, such as the electronic storage 318 of the server 302. However, it will be appreciated that the reception module 1020 may be arranged to receive the electronic processing assembly design 1022 from any suitable source, including an external data storage device, a cloud computing service, a client computing platform 304, external resources 316 etc. The reception module 1020 may be arranged to receive an electronic processing assembly design 1022 input by a user of the system 1000. For example the electronic processing assembly design reception module 1020 may be arranged to facilitate (or allow or otherwise enable) the user to create the electronic processing assembly design 1022. The electronic processing assembly design reception module 1020 may implement (otherwise be or be interfaced to) electronic processing assembly design authoring tools, such as EDA tools, as would be well known to those skilled in the art.

A common processing operation is specified, at least in part, by the electronic processing assembly design 1022. The common processing operation is a processing operation that each individualized electronic processing assembly 1090 based on the electronic processing assembly design 1022 is arranged to perform. The common processing operation may be a processing operation of system such as the system 100 described above with reference to FIG. 1 as such the electronic processing assembly 1090 may be said to implement a system 100. It will be appreciated that the electronic processing assembly design 1022 specifies at least part of the functionality of the resulting electronic processing assemblies. The electronic processing assembly design 1022 may specify logical units (or components) to be included as part of a resulting electronic processing assembly 1090.

A logical unit (or component) may be or comprise any standard electronic component or combination thereof. Typically a logical unit implements logical blocks 106, ..., 116. In this way a logical unit may be considered to be analogous to a logic cell of a processing chip as described previously. A logical unit may comprise a processing chip as described previously. A logical unit may comprise a printed circuit board assembly. A logical unit typically is arranged to carry out a processing sub-operation required in order to enable the electronic processing assembly 1090 to carry out the common processing operation. In this way the common processing operation may be understood as being able to be decomposed (or split up) into a number of required processing sub-operations. The electronic processing assembly design 1022 may specify one or more required processing sub-operations.

The electronic processing assembly design 1022 may specify some or all of the interconnects between logical units of a resulting electronic processing assembly 1090. An interconnect between logical units may be considered to be analogous to the interconnects between logic cells described previously in relation to processing chips 590. In this case interconnects between logical units are not required to be part of an integrated circuit layout, rather they may comprise any of, tacks on a printed circuit board, wires in a wiring loom, jump wires on a printed circuit board etc. The electronic processing assembly design 1022 may take the form of, or comprise any of (or any combination of): one or more printed circuit layouts, one or more netlists, pseudo code, one or more hardware description representations, one or more system wiring diagrams or representations.

The electronic processing assembly design 1022 individualization module 1040 is arranged to produce an individualized electronic processing assembly design $1042_1$, $1042_2$, ..., $1042_n$ based on the electronic processing assembly design 1022. FIG. 10 shows three such individualized electronic processing assembly designs $1042_1$, $1042_2$, ..., $1042_n$, however for ease of understanding the following discussion shall refer to the individualized electronic processing assembly designs $1042_1$, $1042_2$, ..., $1042_n$ in the singular using the reference numeral 1042. For a given required processing operation specified by the electronic processing assembly design 1022 the design individualization module 1040 may specify, in the individualized processing assembly design 1042 a respective individualized processing chip 590 from a batch 599 of individualized processing chips 590. The individualized processing chips 590 of the batch 599 being arranged to carry out the given required processing sub-operation. The respective individualized chip 590 is arranged to carry out the given required processing sub-operation and to apply an respective overall transformation to an input or an output of the given processing sub-operation. It will be appreciated that a number of individualized processing chips 590 may be selected corresponding to respective required sub-processing operations, each with respective overall transformations. An individualized processing chip 590 may be specified in the individualized electronic processing assembly design 1042 by way of an identifier of the individualized processing chip 590 (in the corresponding individualized processing design) as discussed previously.

The design individualization module 1040 is arranged to include, as part of the individualized electronic processing assembly design 1042, a set of modifications that implement an individualized set of transformations. It will be appreciated that the design individualization module 1040 may produce a plurality of individualized electronic processing assembly designs $1042_1$, $1042_2$, ..., $1042_n$, based on the electronic processing assembly design 1022. Typically, each individualized electronic processing assembly design $1042_1$, $1042_2$, ..., $1042_n$ includes a respective set of modifications that implement an individualized set of transformations for said individualized electronic processing assembly design $1042_1$, $1042_2$, ..., $1042_n$. Each individualized electronic processing assembly design $1042_1$, $1042_2$, ..., $1042_n$ may also specify one or more respective individualized processing chips that implement one or more corresponding required processing sub-operations.

The individualized set of transformations implemented in one individualized electronic processing assembly design $1042_1$ may be different to the individualized set of transformations for at least one other electronic processing assembly design $1042_2$ individualized electronic processing assembly design. Additionally, or alternatively, for a given required processing sub-operation the transform applied by the corresponding individualized processing chip $590_1$ specified in one individualized electronic processing assembly design $1042_1$ is different to the transform applied by the individualized processing chip $590_2$ specified for at least one other electronic processing assembly design $1042_2$. In some embodiments, the individualized set of transformations implemented in each individualized electronic processing assembly design is different to the individualized set of transformations implemented in each other individualized electronic processing assembly design. Additionally, or alternatively, for a given required processing sub-operation the transform applied by the corresponding individualized processing chip $590_1$ specified in one individualized electronic processing assembly design is different to the transform applied by the individualized processing chip $590_2$ specified for each other electronic processing assembly design. In this way it may be understood that in some embodiments the individualized set of transformations is specific to the corresponding individualized electronic processing assembly design 1042. Similarly in some embodiments for a given required processing sub-operation the transform applied by the individualized processing chip 590 is specific to the corresponding individualized electronic processing assembly design 1042.

The individualization module 1040 may be arranged to receive the set of modifications for including in an individualized electronic processing assembly design 1042 from a storage, such as the electronic storage 318 of the server 302. However, it will be appreciated that the individualization module 1040 may be arranged to receive the set of modifications for including in an individualized electronic processing assembly design 1042 from any suitable source, including an external data storage device, a cloud computing service, a client computing platform 304, external resources 316 etc. Additionally, or alternatively the individualization module 1040 may be arranged to receive the set of modifications for including in an individualized electronic processing assembly design input by a user of the system 1000. For example the system 1000 may also comprise a design providing module 1060 as described previously. The design providing module 1060 may be arranged to facilitate (or allow or otherwise enable) the user to create the set of modifications for including in an individualized electronic processing assembly design, for example through the use of electronic processing assembly design authoring tools as described previously. The identity(s) of the individualized processing chip (or individualized processing chip designs) may be received in an analogous manner.

An individualized set of transformations comprise one or more transformations, such as the transformations described previously. In this case the transformations are typically transformations applied to interconnects between logical units of the electronic processing assembly 1090.

An individualized set of transformations are arranged such that when they are implemented in the individualized electronic processing assembly design 1042 the common processing operation of the individualized electronic processing assembly design 1042 is preserved. In this way the resulting individualized electronic processing assembly 1090 is arranged to carry out the common processing operation. The individualized set of transformations may be arranged such that when they are implemented in the electronic processing assembly design 1042 an overall transformation is applied to the input and/or output of the common processing operation. In this way the resulting individualized electronic processing assembly 1090 is arranged to carry out the common processing operation with the overall transformation being applied to the input and or output of the common processing operation. As such, it will be appreciated that the set of transforms when implemented in the individualized electronic processing assembly design 1042 preserve the functionality of the resulting individualized electronic processing assembly 1090 (to within an overall transformation operation).

At least one transformation of the individualized set of transformations is compensated for by one or more other transformations in the individualized set of transformations. Additionally, or alternatively, the transformation of at least one of the specified individualized processing chips 590 may be compensated for by one or more transformations in the individualized set of transformations. Similarly, the transformation of at least one of the specified individualized processing chips may be compensated for by the transformation of at least one other specified individualized processing chip 590.

In some embodiments the individualized set of transformations comprise one or more pairs of transformations, wherein for each pair of transformations one of the pair of transformations is the inverse of the other transformation of the pair. In some further embodiments for a pair of transformations one of the pair of transformations is for one end of the interconnect and one transformation for another end of the interconnect. In this way an initial signal output by a logical unit at one end of the transformation in transformed for transmission along the interconnect. The inverse transformation is applied to the transformed signal at the other end of the interconnect such that a logical unit this other end receives the initial signal. It will be appreciated that transformations may be implemented at or near to interfaces between logical units and interconnects. In particular the transformation may be implemented within the logical unit at the interface, or as part of the interconnect at the interface. However, transformations may be implemented at any suitable point. Transformations may be implemented at any point along a given interconnect between two or more logic cells.

The set of modifications is arranged to implement a corresponding individualized set of transformations when included as part of the individualized electronic processing assembly design 1042. The modification (or modifications) that implement a given transformation may implement the transform directly (or in full). For example, the transform may swap (or interchange or permute) two signal lines of an interconnect. Here the modification may swap the two signal lines at the point where the interconnect connects to the corresponding logic cell. The modification (or modifications) that implement a given transformation may implement the transform indirectly (or in part). As set out above a electronic processing assembly design 1042 may specify configurable blocks. A configurable block may comprise a partial logic circuit that enables any one of a number of transforms to be implemented. The transform implemented by the configurable block may be selected by how the partial logic circuit is completed. The modification (or modifications) that implement a given transformation may implement the transform partially, such as in conjunction with a configurable block. The modification(s) may be modification(s) that complete the configurable block.

The set of modification's may comprise any of: modifications to one or more printed circuit layouts of the electronic processing assembly design, modifications to one or more netlists of the electronic processing assembly design, modification to hardware description language code forming part of the electronic processing assembly design, modification to one or more system wiring representations of the electronic processing assembly design. The set of modifications may comprise (or result in or otherwise specify) any of: inclusion of additional VIAs in a printed circuit layout, removal of one or more VIAs, substitution of one or more VIAs specified by the electronic processing assembly design for one or more further VIAs, changes to one or more signal lines, inclusion of additional logic gates or components, etc. It will be appreciated that different modifications may be more easily made in different parts of the electronic processing assembly design.

The individualized design provision module 1060 is arranged to provide (or transmit) the individualized electronic processing assembly design(s) for fabrication of individualized electronic processing assembly(s) $1090_1$, $1090_2, \ldots, 1090_n$ according to the individualized electronic processing assembly design(s). The individualized design provision module 1060 may be connected to a fabrication system 1112. The fabrication system 1112 may be a system arranged to fabricate individualized electronic processing assembly(s) $1090_1$, $1090_2, \ldots, 1090_n$ according to the individualized electronic processing assembly design(s). The individualized design provision module 1060 may be arranged to provide the individualized electronic processing assembly design(s) to the fabrication system 1112. The individualized design provision module 1060 and the fabrication system 1112 may be arranged to communicate with each other over, or via, an electronic communication link (or links) as described previously or any kind of network suitable for transmitting or communicating data from individualized design provision module 1060 and the fabrication system 1112. For example, the network could comprise one or more of: a local area network, a wide area network, a metropolitan area network, the internet, a wireless communications network, a cable network, a digital broadcast network, a satellite communication network, a telephone network, etc. The individualized design provision module 1060 and the fabrication system 1112 may communicate via any suitable communication mechanism/protocol in order to communicate data with each other. The connection between individualized design provision module 1060 and the fabrication system 1112 may be secured, such as by known cryptographic techniques, involving encryption and/or cryptographic signing of data exchanged over the connection. As set out above in relation to the individualized design provision module 560, the individualized electronic processing assembly design(s) may be provided in a batch or off-line manner.

The fabrication system 1112 may comprise one or more fabrication devices used in the production of electronic processing assemblies 1090. The fabrication system 1112 may comprise any combination of systems and devices suitable for fabrication of printed circuit boards, system wiring looms, device assembly etc. As the fabrication of electronic processing assemblies 1090 is well known such a fabrication system is not discussed further herein. It will be appreciated that the system 1000 described above may itself be part of, or co-located with, the fabrication system 1112. The system 1000 described above may be remote from the fabrication system 1112. As set out previously, the invention contemplates creating individualized electronic processing assembly designs 1042 and thus the fabrication system 1112 is not necessarily a part of the invention.

The system 1000 may optionally comprise an electronic processing assembly identification storing module. The electronic processing assembly identification storing module may be configured to store an identification of an individualized electronic processing assembly 1090 (and/or an individualized electronic processing assembly design) in correspondence with one or both of: the respective set of modifications, and the identities of the individualized processing chips 590 of the individualized electronic processing assembly 1090. Additionally, or alternatively, the identification storing module 314 may be configured to store an identification of an individualized electronic processing assembly 1090 (and/or an individualized electronic processing assembly design) in correspondence with one or both of: the individualized set of transformations for the individualized electronic processing assembly $1090_1$, $1090_2, \ldots, 1090_n$, and the respective transformations of the individualized processing chips 590 of the individualized electronic processing assembly $1090_1$, $1090_2, \ldots, 1090_n$. Where the individualized transforms implement a respective overall transform applied to the common processing operation of an individualized electronic processing assembly 1090, the identification storing module may be configured to store an identification of an individualized electronic processing assembly $1090_1$, $1090_2, \ldots, 1090_n$ (and/or an individualized electronic processing assembly design) in correspondence with the respective overall transform. The identification storing module can include memory for storing the identification or can cause the identification to be stored externally, such as in external resources 316. Additionally, or alternatively the identification of an individualized electronic processing assembly 1090 may be stored on or as part of the individualized electronic processing assembly 1090. The identification may be printed (or etched or otherwise indicated) on the individualized electronic processing assembly 1090. The identification may be stored on the individualized electronic processing assembly 1090. The identification may be stored, at least in part, on the individualized electronic processing assembly 1090 using programmable read-only memory. Additionally or alternatively, the identification may be stored, at least in part, on the individualized electronic processing assembly 1090 using one or more modifications included in the individualized design, such as those described above. The individualized electronic processing assembly 1090 may provide an interface or other mechanism to allow a device to interrogate the individualized electronic processing assembly 1090 and retrieve the identification. Such an interface may be secured against unauthorized access.

Figure 11:
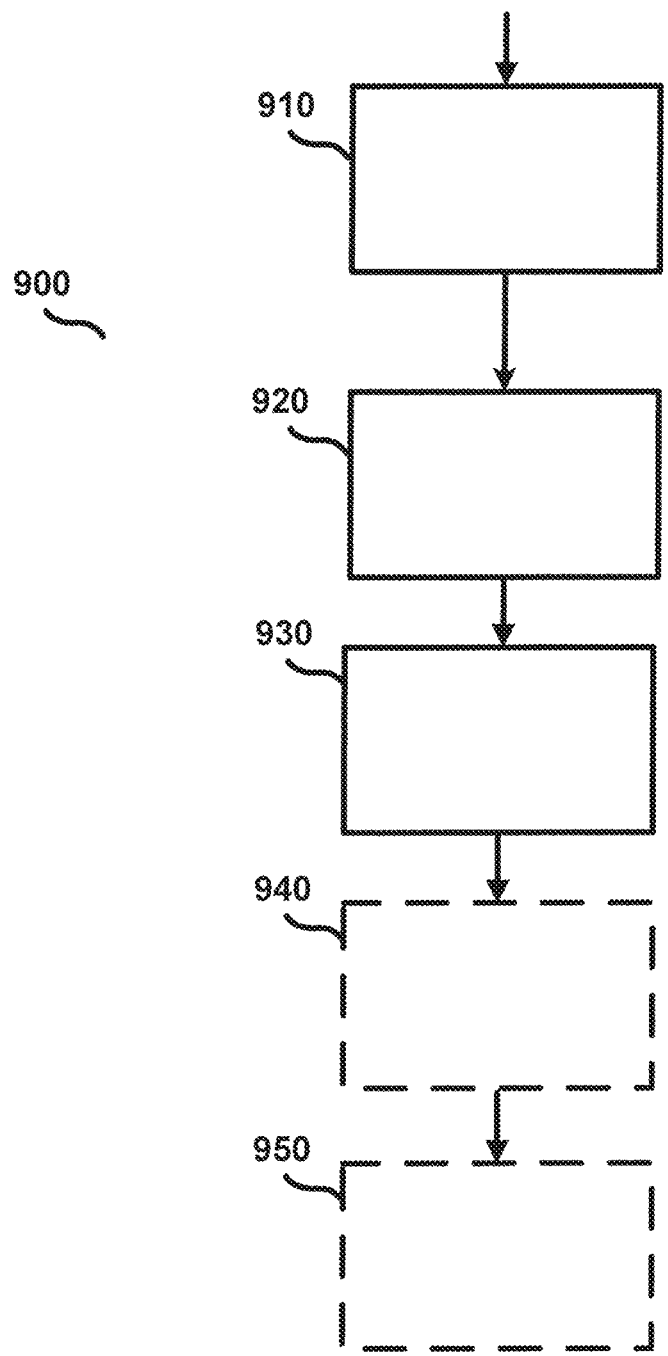
FIG. 11 is a flowchart of a method for producing individualized electronic processing assemblies, in accordance with one or more implementations.

FIG. 11 schematically illustrates a method 900 producing individualized electronic processing assemblies each individualized electronic processing assembly 1090 being arranged to carry out a common processing operation, in accordance with one or more implementations. The method 900 may be carried out by the system 1000 as described above with reference to FIG. 5. The operations of method 900 presented below are intended to be illustrative. In some implementations, method 900 may be accomplished with one or more additional operations not described, and/or without one or more of the operations discussed. Additionally, the order in which the operations of method 9006000 are illustrated in FIG. 11 and described below is not intended to be limiting.

In some implementations, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At a step 910 the method comprises receiving a processing assembly design 1022. A common processing operation is specified, at least in part, by the processing assembly design 1022, and a required processing sub-operation of the common processing operation is specified, at least in part, by the processing assembly design. The step 910 may be performed by one or more hardware processors configured by machine-readable instructions including a module that is the same as or similar to the electronic processing assembly design reception module 1020, in accordance with one or more implementations.

At a step 920 the method comprises individualizing the processing assembly design 1022 to produce an individualized processing assembly design 1042, in accordance with an individualized set of transformations for the individualized processing assembly 1090. The step 920 further comprises including a respective set of modifications in the individualized processing assembly design 1042 that implement the individualized set of transformations. The step 920 further comprises specifying a respective individualized processing chip 590 from a batch of individualized processing chips 599 as a logical unit of the processing assembly design 1022, said respective individualized chip being arranged to carry out the required processing sub-operation and to apply an respective overall transformation to an input or an output of the processing sub-operation. The step 920 may be performed by one or more hardware processors configured by machine-readable instructions including a module that is the same as or similar to the electronic processing assembly design individualization module 1040, in accordance with one or more implementations.

At a step 930 the method comprises providing the individualized processing assembly design for fabrication of an individualized electronic processing assembly 1090 according to the individualized processing assembly design 1042. The step 930 may be performed by one or more hardware processors configured by machine-readable instructions including a module that is the same as or similar to the electronic processing assembly individualized design provision module 1060, in accordance with one or more implementations.

At an optional step 940 the method may comprise fabricating the individualized electronic processing assembly 1090 according to the individualized processing assembly design. The step 940 may also comprise manufacturing one or more copies of the individualized electronic processing assembly 1090 according to the individualized processing assembly design 1042. The step 940 may be performed by the fabrication system 1112, in accordance with one or more implementations. As set out previously the fabrication of the individualized electronic processing assemblies 1090 can be separate from, and need not be included in, the invention. As such, the step 940 is presented as being optional.

At an optional step 950 the method may comprise storing an identification of an individualized electronic processing assembly 1090 (and/or an individualized electronic processing assembly design 1042) in correspondence with one or both of: the respective set of modifications, and the identities of the individualized processing chips of the individualized electronic processing assembly. Additionally, or alternatively, the step 950 may comprise storing an identification of an individualized electronic processing assembly 1090 (and/or an individualized electronic processing assembly design 1042) in correspondence with one or both of: the individualized set of transformations for the individualized electronic processing assembly 1090, and the respective transformations of the individualized processing chips of the individualized electronic processing assembly 1090. The step 950 may be performed by one or more hardware processors configured by machine-readable instructions including a module that is the same as or similar to the identification storing module 314, in accordance with one or more implementations.

It will be appreciated that the step 920 and the step 930 (optionally including either or both of the steps 940 and 950) may be repeated for each individualized electronic processing assembly 1090, or each individualized electronic processing assembly design 1042 required without requiring the step 910 to be repeated. These repeated steps may be carried out in serial or parallel. In this way a batch of individualized processing assemblies 1099 may be produced.

In particular each individualized electronic processing assembly 1090 is arranged to carry out a common processing operation, the common processing operation having a required processing sub-operation. Further each individualized electronic processing assembly 1090 comprises: a plurality of processing chips common to the individualized electronic processing assemblies 1090, a respective individualized processing chip 590 selected from a batch of individualized processing chips 599 (such as that described previously herein), a plurality of interconnects common to the individualized electronic processing assemblies and a respective set of modifications that implement an individualized set of transformations for the individualized electronic processing assembly 1090. Here each respective individualized processing chip 590 is arranged to carry out the required processing sub-operation and arranged to apply a respective overall transformation to an input or an output of the common processing sub-operation. Further each transformation, of the individualized set of transformations for the individualized electronic processing assembly 1090, is a transform for a respective interconnect of the plurality of interconnects. The individualized set of transformations and the respective transform applied by the individualized processing chip 590 for one electronic processing assembly are different to the individualized set of transformations and the respective transform applied by the individualized processing chip 590 for at least one other electronic processing assembly.

It will be appreciated that individualized electronic processing assemblies 1090 may themselves be used as logic units for other individualized electronic processing assemblies 1090. As such the preceding discussions apply analogously to the embodiments where one or more individualized electronic processing assemblies 1090 take the place of one or more individualized processing chips 590.

It will be appreciated that in the preceding discussions one or more logic blocks 106, . . . , 116 of a system 100 may be implemented in software executing (or executable) on the processing chip (or electronic processing assembly) corresponding to (or implementing) the system 100. The software may comprise any one or more (or one or more parts of) of: application software, firmware; operating system software, etc. Such software may also be individualized by the inclusion of one or more transforms, such as the transforms discussed previously. In such cases the set of one or more transform in an individualized instance of software may be selected to compensate for one or more transformations of a corresponding individualized electronic processing assembly (such as one or more overall transforms of one or more processing chips in the corresponding individualized electronic processing assembly). In this way the individualized electronic processing assembly may only carry out the common processing operation when the corresponding individualized software instance is executed thereon. This enables the individualized electronic processing assembly to be locked (or tied) to the individualized software (and vice versa).

In other words, in some embodiments a piece of software is arranged to carry out a required processing sub operation the common processing operation. A given individualized electronic processing assembly comprises an individualized version (or instance) of the piece of software which includes at least one transformations of the individualized set of transformations. The individualized set of transformations being selected such that the electronic processing assembly, executing the individualized software as part of the assembly, is arranged to carry out the common processing operation. In some embodiments all of the transformations may be included in the individualized software in preference to the individualized processing assembly.

In such cases a variant step 920 may be employed in the method 900. The variant step 920 comprises individualizing the processing assembly design to produce an individualized processing assembly design, in accordance with an individualized set of transformations for the individualized processing assembly. The step 920 may comprise including a respective set of modifications in the individualized processing assembly design that implement at least one of the individualized set of transformations. The step 920 further comprises individualizing a predetermined piece of software to produce an individualized piece of software by including the remaining transformations of the individualized set of transformations. The step 920 further comprises specifying a respective individualized processing chip from a batch of individualized processing chips as a logical unit of the processing assembly design, said respective individualized chip being arranged to carry out the required processing sub-operation and to apply an respective overall transformation to an input or an output of the processing sub-operation.

Figure 12:
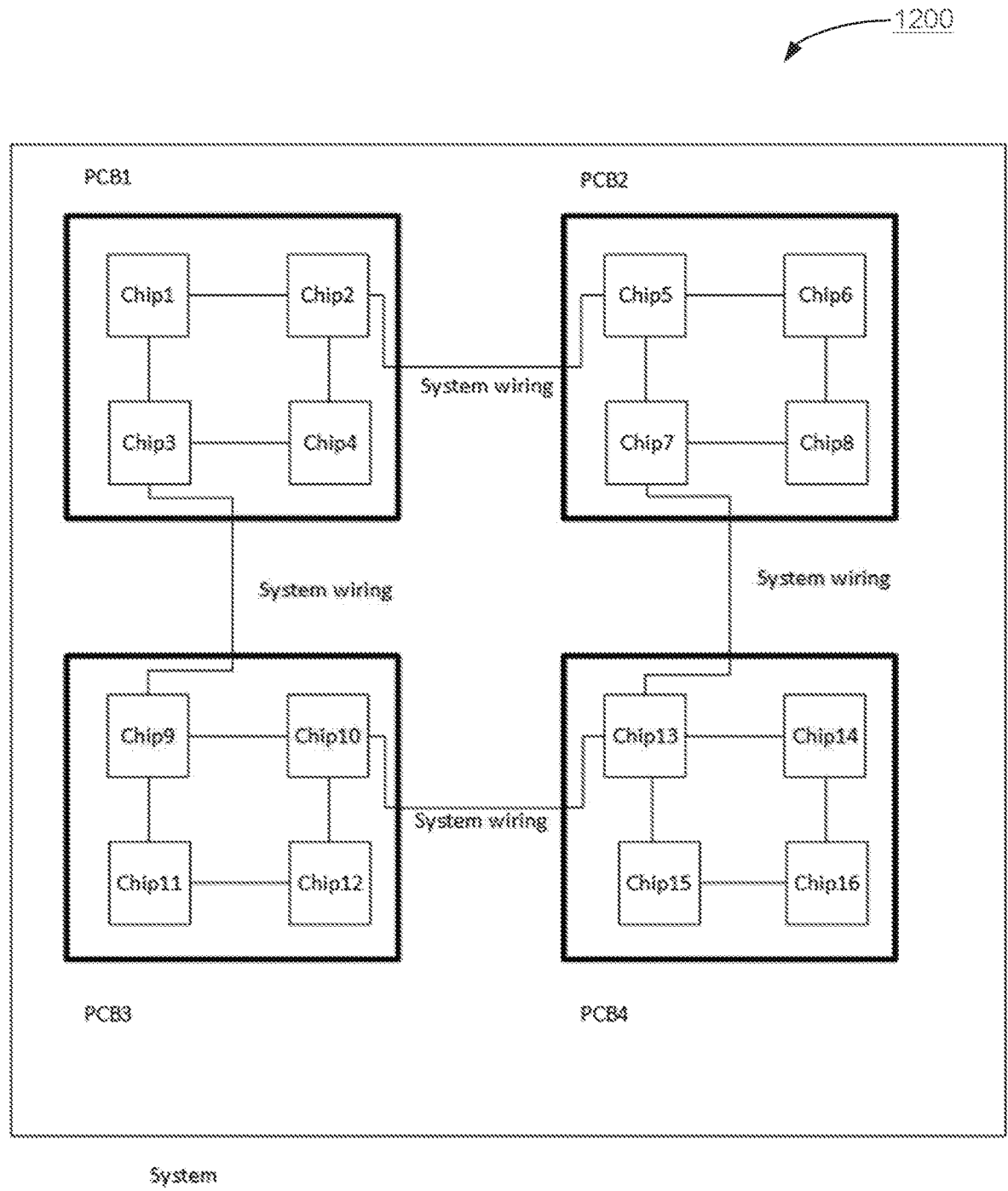
FIG. 12 is a schematic block diagram of a system used for describing various use cases.

Some specific use cases of the embodiments are discussed below in connection with FIG. 12 which illustrates a system 1200 including multiple PCBs. Each PCB includes multiple chips. Note that the computer hardware processor can be system 1200 or any of the PCBs or Chips, alone or in combination.

On a chip level, the diversification (or individualization) on groups of signals will be realized in extra functionality in each cell (or logic cell or logical unit). There are several methods to realize this. For example, a selection can be made from several predesigned, pre-implemented transformation functions. This transformation is selected by either uniquely programmable VIAs or by any other chip unique mechanism such as the programmable OTP, programmable floating gate transistor. An advantage is that chip design tools can handle the checks of design rules and other aspects of those predetermined transformations. At chip implementation, a chosen transformation may be dynamically created per cell during unique realization of the chip. As an example, the e-beam technology allows for unique realization of parts of the cell which implements the input and output transformations. In cases where chips cannot be produced uniquely, the bonding wires (which connect chip die with package pins) may have unique permutations applied to them by controlling the bonding machines to render unique bondings per chip.

The unique PCBs can be realized by laser controlled exposure of photo resists in a typical PCB etch process. The unique system interconnect wiring can be realized by computer controlled production processes. The application of the described diversification (or individualization) process may result in unique systems which are composed of unique wiring, unique PCBs and unique chips.

The design tools used for such a system may be enhanced to apply the various transformations in a way which is transparent for any system design development tasks as debugging, build in self-test (BIST) and usage of debug signals. Typically, test tools will be equipped with knowledge of the uniquely applied diversifications of the system under test. The design diversification database can provide information needed for test tools and debugging tools to perform the functional debugging on a level which may conceal some or all of the diversification. In some embodiments debugging tools may go into the diversified instance detail to debug on that level. In addition, diversification patterns may be designed upfront to be tested and conform to predetermined design rules and guidelines. This may avoid having to test every combination of diversified details of a given system.

Each diversified instance of a cell may be designed in such a way as to fulfil the design rule of the chip foundry without having to physically test or emulate each potential combination of transformations in the various cells on the chip. Additionally, or alternatively, the maximum number of variants (or individualized designs) per chip may be limited and design rule testing for each such variant can be conducted. During debugging and testing, the test equipment may be provided access to the unique transformations of every chip and PCB under test. This diversification information may be supplied only to authorized personnel and only for the systems under test to further improve security.

Another practical challenge would be the replacement of broken parts. To have readymade spare parts available, the set of diversified transformations of each chip can be limited to a certain maximum. In this way, it is conceivable that each chip has a predetermined number of variants. The variant number will not be printed on the component but will only be known to the chip supplier based on the serial number of the chip. The serial number, or other ID can be printed on the chip and need not be kept secret. The same principle can be applied to the PCBs and system interconnect wiring.

As noted above, the software running on the various sub systems can also be diversified. The idea is that the transformations on groups of signals which are used as input or output interfacing to software functions are not cancelled out by reverse transformations in hardware but are exposed to the software. The software may be designed by means of specialized design tools in the enhanced EDA tool chain with transformations and inverse transformations matching the hardware (such as one or more of the component chips and/or PCBs) that the software is designed to execute on. This would enable each software instance dependent on a particular set of individualized hardware. This would render the software more secure with respect to cloning type attacks and render the software more resistant to reverse engineering. An example of an automated tool which can be modified to apply transformations to variables and input and output data in a program is the Irdeto software transcoder (known as the Cloakware™ transcoder) which modifies source code to render multiple differently modified source code instances. This may further defend against reverse engineering of the software as the attacker has no knowledge of the uniquely diversified hardware and software and the resulting effect this has on the observed behavior on the data the software is handling. There are numerous techniques for such transcoding of software, examples of which can be found in WO2011/120123 and WO2015/150376 both of which are incorporated herein by reference in their entirety. Further examples of techniques for such transcoding of software can be found in U.S. Pat. No. 6,594,761, issued Jul. 15, 2003 and U.S. Pat. No. 6,842,862, issued Jan. 11, 2005 which describe data flow transform techniques, along with U.S. Pat. No. 6,779,114, issued Aug. 17, 2004 which describes control flow transform techniques. The entire disclosures of each of U.S. Pat. Nos. 6,594,761, 6,842,862, and 6,779,114 are incorporated herein by reference in their entirety.

Use Case 1: Intra Chip Diversification

In this use case, after completion of the functional design of the chip (for example resulting in the processing chip design), some or all cell interconnections inside a chip can be diversified (or individualized) but any output signals of cells connected to chip outputs lines (pins) and any input of cells connected to input lines are not diversified. After completion of this functional chip design stage, the diversification tool of server, or the individualization module 540, may automatically select transformations and matching inverse transformations for all groups of signals of all cells in such a way that the overall functionality of the chip as observed on its input and output lines is not changed. The selection is potentially guided by the chip designer to indicate areas which are critical for protection against reverse engineering and security attacks. The system will then apply diversification using random seeds which will be used to select available and predesign diversification instances. The selected set of applied transformations may be a unique choice per chip and may be recorded in a database together with the serial number of that instance of individualized chip, and its functional base model. The database can be stored in data storing module 110 and/or identification storing module 314 of FIG. 3.

Use Case 2: Inter Chip Diversification on PCB

The same diversification concept will be applied to all group of signals interconnecting the chips on a PCB. This can be achieved when the diversification tool of a server applies transformations to inputs and output of cells connected to groups of input and output lines. As with use case 1, such individualization choices will be stored in the database in data storing module 110 and/or identification storing module 314 of FIG. 3.

Use Case 3: Inter PCB Board Diversification

The same diversification concept can be applied to all group of signals interconnecting the PCB in a larger system. This can be achieved by using chips with diversified inputs and outputs which are connected to the signal lines connecting the PCBs. Sometimes, those transformations are not directly applied to the input and output lines but are applied to for example the logical data representation of register values used in communication buses. When this scheme is applied, PCBs in a system cannot be interchanged between functionally identical systems. In addition, the signal representation on the wiring between the PCBs will be different per system.

Use Case 4: PCB Board Diversification

When for example permutations of signal lines are used in the output or input of chips, the applied transformation in a chip can be modified or reversed by the permutation of PCB interconnect traces which interconnect the chips and potentially connect to other PCBs. Using this method every printed circuit board (PCB) can be uniquely diversified to match the uniquely diversified chips and uniquely diversified system interconnects. In this way, an interlock can be achieved between chips and PCBs and systems. Again, the set of applied diversifications to the PCB traces will be recorded in a database together with the serial number of the uniquely diversified PCB.

Use Case 5: System Interconnect Diversification

When for example, permutations of signal lines are used in the output or input of PCBs, the applied transformations in a PCB can be modified or reversed by the permutation of System interconnect wiring which interconnect the PCBs. In this way, an interlock can be achieved between chips, PCBs and system interconnects. Again, the set of applied diversifications to the system interconnect wiring will be recorded in a database together with the serial number of the system. In a fully diversified system, there will be database entries, for every completed system, including the applied diversification of the system wiring, the diversification of the PCBs and the applied diversifications of the individualized chips used on each PCB. This unique diversification on all levels results in a very strong defense against reverse engineering, IP infringement; and Illegal modifications to the system.

Use Case 6: Software Diversification Bound to a Diversified System

In combination with the previous use cases, one can design a system using special tools to uniquely diversify each software instance of every individual system and on every individual PCB. Tools to achieve this are well known (e.g. the CSP set of Cloakware™ by Irdeto which includes the Transcoder). When specific values coming from registers in chips are uniquely diversified by the hardware (chips, PCB and System) the transcoded software can be generated to include data transformations that are the inverse of the matching transformation applied in the uniquely diversified hardware: e.g. when a data value of a temperature sensor is read from a hardware register, the software will know what specific transformation is applied by the hardware. Conversely, if the software will write a value to a hardware actuator register, the software will directly write the transformed value in to the hardware register. This means that the software has no need to first convert the read and written values to and from the so called "smooth" values (the values without any transformation applied). The resulting system of diversified hardware and software realizes the ultimate protection against reverse engineering, code lifting, software tempering and other attacks.

Another example of diversified hardware with matching diversified software is where the instruction set of a processor is uniquely diversified where the binary representation is of a machine language instruction is coded differently per CPU or batch of CPUs. The matching diversified software uses binary machine code which is compiled to exactly the matching instruction set representation of the diversified CPU.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

In the preceding discussions the term "unique" has been used to describe cases where a given element is different to other elements produced by a given system. It will be appreciated that the term "unique" does not require that the element be globally unique, but rather different to other elements in a particular set of selected elements. Also whilst the above systems and methods may allow for elements to be produced that are different to all other elements produced it is not required that the systems and methods be used in this way. Advantages of hardware individualization may still be realized even if a limited number of variants are produced with multiple copies of each variant being present.

In the preceding discussions the processing chips and/or electronic processing assemblies have been described as being arranged to carry out a common processing operation. It will be appreciated that a set (or batch) of processing chips (or electronic processing assemblies) produced by embodiments of the invention may also comprise chips (or electronic processing assemblies) that are arranged to carry out further operations, not common to the batch, in addition to the common processing operation.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

Various examples are also disclosed as follows.

There is disclosed a system configured for creating diverse instances of an electronic hardware component, the system comprising: one or more hardware computer processors; and one or more memories storing machine-readable instructions which, when executed by the one or more hardware processors, cause the one or more hardware processors to: receive a design for an electronic component having predetermined functionality, the design specifying an electronic component having multiple logic elements, each logic element having at least one input and one output and interconnections connecting inputs and output of the logic elements to provide predetermined functionality to the resulting an electronic component; store a data set indicating multiple unique sets of modifications to at least some of the inputs and/or outputs of the logic elements specified by the design; produce a design for a first instance of the electronic component in accordance with the design for an electronic component having a first set of the unique sets of modifications in a manner that does not affect the predetermined functionality; produce a design for a second instance of the electronic component in accordance with the design for an electronic component having a second set of the unique sets of modifications in a manner that does not affect the predetermined functionality; and store an identification of the first instance of the electronic component in correspondence with the first set of the unique sets of modifications and storing an identification of the second instance of the electronic component in correspondence with the second set of the unique sets of modifications; wherein an electronic component manufactured in accordance with the design for the first instance of the electronic component and an electronic component manufactured in accordance with the design for the second instance of the electronic component are unique from one another and an electronic component manufactured in accordance with the design for first instance of the an electronic component and the electronic component manufactured in accordance with the design for second instance of an electronic component both exhibit the same predetermined functionality.

Some examples may comprise manufacturing the electronic component in accordance with the design for first instance of the electronic component and the processor in accordance with the design for second instance of the an electronic component using semiconductor fabrication techniques.

In some examples the semiconductor fabrication techniques include electron beam lithography techniques.

In some examples the logic elements are selected from the group of registers, counters, multipliers, or latches.

In some examples the first set of the unique modifications and the second set of unique modifications each include at least one transformation and a corresponding inverse transformation.

In some examples the at least one transformation is formed at the output of one logic elements and the corresponding inverse transformation is formed at the input of another logic elements that is immediately downstream from the one logic elements.

In some examples each logic elements is a logic unit on a chip.

In some examples each logic elements is a chip.

In some examples each logic elements is a PCB having multiple chips, and wherein each chip has multiple login units.

In some examples the modifications provide an interlock between the logic units whereby only desired logic units can be used in combination.

In some examples a first instance of software is executed by the first instance of the computer hardware processor and wherein a second instance of software is executed by the second instance of the an electronic component, the first instance of software being different from the second instance of software and the first instance of software having the same functionality as the second instance of software.

In some examples the first instance of software and the second instance of software are diverse instances of the same software code.

There is disclosed a method for creating diverse instances of an electronic hardware component, the method comprising: receiving a design for an electronic component having predetermined functionality, the design specifying an electronic component having multiple logic elements, each logic element having at least one input and one output and interconnections connecting inputs and output of the logic elements to provide predetermined functionality to the resulting electronic component; storing a data set indicating multiple unique sets of modifications to at least some of the inputs and/or outputs of the logic elements specified by the design; produce a design for a first instance of the electronic component in accordance with the design having a first set of the unique sets of modifications in a manner that does not affect the predetermined functionality; produce a design for a second instance of the electronic component in accordance with the design having a second set of the unique sets of modifications in a manner that does not affect the predetermined functionality; and store an identification of the first instance of electronic component in correspondence with the first set of the unique sets of modifications and storing an identification of the second instance of the electronic component in correspondence with the second set of the unique sets of modifications.

In some examples the method may further comprise: manufacturing a first instance of the electronic component in accordance with the design having a first set of the unique sets of modifications in a manner that does not affect the predetermined functionality; and manufacturing a second instance of the electronic component in accordance with the design having a second set of the unique sets of modifications in a manner that does not affect the predetermined functionality; wherein the first instance of the electronic component and the second instance of the electronic component are unique from one another and the first instance of the electronic component and the second instance of the electronic component both exhibit the predetermined functionality.

In some examples the manufacturing step comprises semiconductor fabrication.

In some examples the semiconductor fabrication is accomplished with electron beam lithography techniques.

In some examples the logic elements are selected from the group of registers, counters, multipliers, or latches.

In some examples the first set of the unique modifications and the second set of unique modifications each include at least one transformation and a corresponding inverse transformation.

In some examples the at least one transformation is formed at the output of one logic elements and the corresponding inverse transformation is formed at the input of another logic elements that is immediately downstream from the one logic elements.

In some examples each logic elements is a logic unit on a chip.

In some examples each logic elements is a chip.

In some examples each logic elements is a PCB having multiple chips, and wherein each chip has multiple login units.

In some examples the modifications provide an interlock between the logic units whereby only desired logic units can be used in combination.

In some examples a first instance of software is executed by the first instance of the electronic component and wherein a second instance of software is executed by the second instance of the electronic component, the first instance of software being different from the second instance of software and the first instance of software having the same functionality as the second instance of software.

In some examples the first instance of software and the second instance of software are diverse instances of the same software code.

There is disclosed a non-transient computer-readable storage medium having instructions embodied thereon, the instructions being executable by one or more processors to perform a method for creating diverse instances of an electronic hardware component, the method comprising: receiving a design for an electronic component having predetermined functionality, the design specifying an electronic component having multiple logic elements, each logic element having at least one input and one output and interconnections connecting inputs and output of the logic elements to provide predetermined functionality to the resulting electronic component; storing a data set indicating multiple unique sets of modifications to at least some of the inputs and/or outputs of the logic elements specified by the design; produce a design for a first instance of the electronic component in accordance with the design for an electronic component having a first set of the unique sets of modifications in a manner that does not affect the predetermined functionality; produce a design for a second instance of the electronic component in accordance with the design for an electronic component having a second set of the unique sets of modifications in a manner that does not affect the predetermined functionality; and store an identification of the first instance of the electronic component in correspondence with the first set of the unique sets of modifications and storing an identification of the second instance of the electronic component in correspondence with the second set of the unique sets of modifications.

In some examples the method further comprises: manufacturing a first instance of the electronic component in accordance with the design having a first set of the unique sets of modifications in a manner that does not affect the predetermined functionality; and manufacturing a second instance of the electronic component in accordance with the design having a second set of the unique sets of modifications in a manner that does not affect the predetermined functionality; wherein the first instance of the electronic component and the second instance of the electronic component are unique from one another and the first instance of the electronic component and the second instance of the electronic component both exhibit the predetermined functionality.

In some examples the manufacturing step comprises semiconductor fabrication.

In some examples the semiconductor fabrication is accomplished with electron beam lithography techniques.

In some examples the logic elements are selected from the group of registers, counters, multipliers, or latches.

In some examples the first set of the unique modifications and the second set of unique modifications each include at least one transformation and a corresponding inverse transformation.

In some examples the at least one transformation is formed at the output of one logic elements and the corresponding inverse transformation is formed at the input of another logic elements that is immediately downstream from the one logic elements.

In some examples each logic elements is a logic unit on a chip.

In some examples each logic elements is a chip.

In some examples each logic elements is a PCB having multiple chips, and wherein each chip has multiple login units.

In some examples the modifications provide an interlock between the logic units whereby only desired logic units can be used in combination.

In some examples a first instance of software is executed by the first instance of the electronic component and wherein a second instance of software is executed by the second instance of the electronic component, the first instance of software being different from the second instance of software and the first instance of software having the same functionality as the second instance of software.

In some examples the first instance of software and the second instance of software are diverse instances of the same software code.

There is disclosed an instance of electronic hardware component, the computing platform comprising: multiple logic elements, each logic element having at least one input and one output and interconnections connecting inputs and output of the logic elements to provide predetermined functionality to the instance of the electronic component; wherein instance of electronic hardware component is based on a design specifying an electronic component and includes a first set of multiple unique sets of modifications in a manner that does not affect the predetermined functionality.

In some examples the instance is manufactured using semiconductor fabrication.

In some examples the semiconductor fabrication includes electron beam lithography techniques.

In some examples the logic elements are selected from the group of registers, counters, multipliers, or latches.

In some examples the first set of the unique modifications includes at least one transformation and a corresponding inverse transformation.

In some examples the at least one transformation is formed at the output of one logic elements and the corresponding inverse transformation is formed at the input of another logic elements that is immediately downstream from the one logic elements.

In some examples each logic element is a logic unit on a chip.

In some examples each logic element is a chip.

In some examples each logic element is a PCB having multiple chips, and wherein each chip has multiple login units.

In some examples the modifications provide an interlock between the logic units whereby only desired logic units can be used in combination.

What is claimed is:

1. A method for producing individualized processing chips, each individualized processing chip being arranged to carry out a common processing operation, the method comprising:
   receiving a processing chip design, wherein the common processing operation is specified, at least in part, by the processing chip design; and
   for each individualized processing chip to be produced:
      individualizing the processing chip design to produce an individualized processing chip design, in accordance with an individualized set of transformations for the individualized processing chip, by including a respective set of modifications as part of the individualized processing chip design that implement the individualized set of transformations,
      wherein each transformation of the individualized set of transformations is a transform for an interconnect, specified in the processing chip design, of at least two logic cells specified in the processing chip design; and
      providing the individualized processing chip design for fabrication of the individualized processing chip according to the individualized processing chip design,
      wherein the individualized set of transformations for one individualized chip is different to the individualized set of transformations for at least one other individualized chip.

2. The method of claim 1 further comprising, for each individualized processing chip to be produced, fabricating the individualized processing chip according to the individualized processing chip design.

3. The method according to claim 2 wherein the step of fabricating comprises fabricating one or more copies of the individualized processing chip according to the individualized processing chip design.

4. The method according to claim 2 wherein the step of fabricating comprises for each logic cell of the first set of logic cells, applying the set of modifications using e-beam lithography.

5. The method of claim 1 further comprising, for each individualized processing chip to be produced, receiving the respective set of modifications from a storage.

6. The method according to claim 1 further comprising for each individualized chip, storing an identification of the individualized chip in correspondence with either: (a) the respective set of modifications or (b) the individualized set of transformations for the individualized chip.

7. The method according to claim 1 wherein at least one transformation of the individualized set of transformations is compensated for by one or more other transformations in the individualized set of transformations.

8. The method according to claim 1 wherein the individualized set of transformations comprise one or more pairs of transformations, wherein for each pair of transformations one of the pair of transformations is the inverse of the other transformation of the pair.

9. The method according to claim 8 wherein for each pair of transformations one of the pair of transformations is for one end of the interconnect and one transformation for another end of the interconnect.

10. The method according to claim 1 wherein the individualized set of transformations are selected such that the individualized chip is arranged to carry out the common operation with an overall transformation applied to an input or an output of the common processing operation.

11. The method according to claim 1 wherein the individualized set of transformations are selected such that, for any input, every individualized chip produces the same output.

12. The method according to claim 1 wherein a modification of the respective set of modifications comprise any of:
one or more additional VIAs;
one or more VIA connections;
one or more changes to signal lines of the corresponding logic cell interconnect;
one or more additional transistors; and;
one or more additional logic units.

13. The method according to claim 1 wherein a transformation of the individualized set of transformations comprises a transformation of a signal representation of the corresponding logical cell interconnect.

14. The method according to claim 1 wherein the transformation of the individualized set of transformations comprises any of:
a logical NOT operation being applied to one or more signal lines of the of the corresponding logic cell interconnect;
a permutation of two or more signal lines of the corresponding logic cell interconnect; and
a linear formula being applied to a signal value carried by the corresponding logic cell interconnect.

15. A batch of individualized processing chips, wherein each processing chip is arranged to carry out a common processing operation, each individualized processing chip comprising:
a plurality of logic cells common to the plurality of individualized chips;
a plurality of interconnects common to the plurality of individualized chips, each interconnect of the plurality of interconnects connecting two or more respective logic cells of the plurality of logic cells;
a respective set of modifications that implement an individualized set of transformations for the individualized processing chip,
wherein each transformation of the individualized set of transformations for the individualized processing chip, is a transform for a respective interconnect of the plurality of interconnects,
wherein the individualized set of transformations for one individualized chip is different to the individualized set of transformations for at least one other individualized chip.

16. A system for producing individualized processing chips, each individualized processing chip being arranged to carry out a common processing operation, the system comprising:
one or more hardware computer processors; and
one or more memories storing machine-readable instructions which, when executed by the one or more hardware processors, cause the one or more hardware processors to:
receive a processing chip design, wherein the common processing operation is specified, at least in part, by the processing chip design; and
for each individualized processing chip to be produced:
individualize the processing chip design to produce an individualized processing chip design, in accordance with an individualized set of transformations for the individualized processing chip, by including a respective set of modifications as part of the individualized processing chip design that implement the individualized set of transformations,
wherein each transformation of the individualized set of transformations is a transform for an interconnect, specified in the processing chip design, of at least two logic cells specified in the processing chip design; and
provide the individualized processing chip design for fabrication of the individualized processing chip according to the individualized processing chip design,
wherein the individualized set of transformations for one individualized chip is different to the individualized set of transformations for at least one other individualized chip.

17. The system of claim 16 further comprising a fabrication system configured to, for each individualized processing chip to be produced, fabricate the individualized processing chip according to the individualized processing chip design.

18. The system of claim 17 wherein the fabrication system is further configured to fabricate one or more copies of the individualized processing chip according to the individualized processing chip design.

19. The system of claim 17 wherein for each logic cell of the first set of logic cells, the fabrication system is arranged to apply the set of modifications using e-beam lithography.

20. The system of claim 16 wherein the machine-readable instructions which, when executed by the one or more hardware processors, further cause the one or more hardware processors to, for each individualized processing chip to be produced, receive the respective set of modifications from a storage.

21. The system of claim 16 wherein the machine-readable instructions which, when executed by the one or more hardware processors, further cause the one or more hardware processors to, for each individualized chip, store an identification of the individualized chip in correspondence with either: (a) the respective set of modifications or (b) the individualized set of transformations for the individualized chip.

22. The system of claim 16 wherein at least one transformation of the individualized set of transformations is compensated for by one or more other transformations in the individualized set of transformations.

23. The system of claim 16 wherein the individualized set of transformations comprise one or more pairs of transformations, wherein for each pair of transformations one of the pair of transformations is the inverse of the other transformation of the pair.

24. The system of claim 23 wherein for each pair of transformations one of the pair of transformations is for one end of the interconnect and one transformation for another end of the interconnect.

25. The system of claim 16 wherein the individualized set of transformations are selected such that the individualized chip is arranged to carry out the common operation with an overall transformation applied to an input or an output of the common processing operation.

26. The system of claim 16 wherein the individualized set of transformations are selected such that, for any input, every individualized chip produces the same output.

27. The system of claim 16 wherein a modification of the respective set of modifications comprise any of:
- one or more additional VIAs;
- one or more VIA connections;
- one or more changes to signal lines of the corresponding logic cell interconnect;
- one or more additional transistors; and;
- one or more additional logic units.

28. The system of claim 16 wherein a transformation of the individualized set of transformations comprises a transformation of a signal representation of the corresponding logical cell interconnect.

29. The system of claim 16 wherein the transformation of the individualized set of transformations comprises any of:
- a logical NOT operation being applied to one or more signal lines of the of the corresponding logic cell interconnect;
- a permutation of two or more signal lines of the corresponding logic cell interconnect; and
- a linear formula being applied to a signal value carried by the corresponding logic cell interconnect.

30. A non-transient computer-readable storage medium having instructions embodied thereon, the instructions being executable by one or more processors to perform a method for producing diverse instances of an electronic hardware component, the method comprising:
- receiving a processing chip design, wherein the common processing operation is specified, at least in part, by the processing chip design; and
- for each individualized processing chip to be produced:
  - individualizing the processing chip design to produce an individualized processing chip design, in accordance with an individualized set of transformations for the individualized processing chip, by including a respective set of modifications as part of the individualized processing chip design that implement the individualized set of transformations,
  - wherein each transformation of the individualized set of transformations is a transform for an interconnect, specified in the processing chip design, of at least two logic cells specified in the processing chip design; and
  - providing the individualized processing chip design for fabrication of the individualized processing chip according to the individualized processing chip design,
- wherein the individualized set of transformations for one individualized chip is different to the individualized set of transformations for at least one other individualized chip.

* * * * *